(12) United States Patent
Yu et al.

(10) Patent No.: US 11,894,886 B2
(45) Date of Patent: Feb. 6, 2024

(54) COMMUNICATION METHOD AND APPARATUS

(71) Applicant: HUAWEI TECHNOLOGIES CO., LTD., Shenzhen (CN)

(72) Inventors: Jian Yu, Beijing (CN); Zhiheng Guo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/160,017

(22) Filed: Jan. 26, 2023

(65) Prior Publication Data
US 2023/0170941 A1 Jun. 1, 2023

Related U.S. Application Data

(63) Continuation of application No. PCT/CN2021/109225, filed on Jul. 29, 2021.

(30) Foreign Application Priority Data

Jul. 30, 2020 (CN) .......................... 202010752364.0

(51) Int. Cl.
*H04B 7/005* (2006.01)
*H04L 5/00* (2006.01)

(52) U.S. Cl.
CPC ........... *H04B 7/005* (2013.01); *H04L 5/0007* (2013.01); *H04L 5/0048* (2013.01)

(58) Field of Classification Search
CPC .... H04B 7/005; H04B 7/0413; H04B 7/0456; H04B 7/0486; H04L 5/0007; H04L 5/0048
See application file for complete search history.

(56) References Cited

U.S. PATENT DOCUMENTS 9,755,719 B2* 9/2017 Kim ..................... H04B 7/0469
2014/0016549 A1 1/2014 Novlan et al.
(Continued)

FOREIGN PATENT DOCUMENTS

| CN | 103209012 A | 7/2013 |
| CN | 103746779 A | 4/2014 |

(Continued)

OTHER PUBLICATIONS

Machine Translation of JP-2016533098-A. (Year: 2023).*

(Continued)

*Primary Examiner* — Jean B Corrielus
(74) *Attorney, Agent, or Firm* — HAUPTMAN HAM, LLP

(57) ABSTRACT

A communication method includes receiving, by a terminal device, first information from a network device. The first information indicates a precoding matrix. The communication method also includes determining, by the terminal device, the precoding matrix based on the first information. The precoding matrix is for sending an uplink signal. The precoding matrix is determined based on a first matrix and a second matrix. At least one of the first matrix is determined from a first matrix set based on the first information, wherein the first matrix set is determined based on a horizontal-dimension parameter of an antenna of the terminal device; or the second matrix is determined from a second matrix set based on the first information, wherein the second matrix set is determined based on a vertical-dimension parameter of the antenna.

20 Claims, 3 Drawing Sheets

(56) References Cited

U.S. PATENT DOCUMENTS

| | | |
|---|---|---|
| 2015/0146650 A1 | 5/2015 | Ko et al. |
| 2018/0241449 A1 | 8/2018 | Li et al. |
| 2019/0140714 A1 | 5/2019 | Tan et al. |
| 2020/0052747 A1 | 2/2020 | Onggosanusi et al. |

FOREIGN PATENT DOCUMENTS

| | | |
|---|---|---|
| CN | 103840870 A | 6/2014 |
| CN | 105207740 A | 12/2015 |
| CN | 107690756 A | 2/2018 |
| CN | 107925451 A | 4/2018 |
| CN | 108282207 A | 7/2018 |
| CN | 108811062 A | 11/2018 |
| CN | 109309518 A | 2/2019 |
| CN | 110100393 A | 8/2019 |
| CN | 110679125 A | 1/2020 |
| JP | 2018526908 A | 9/2018 |
| WO | 2016080737 A1 | 5/2016 |
| WO | 2018028310 A1 | 2/2018 |
| WO | 2018127151 A1 | 7/2018 |

OTHER PUBLICATIONS

3GPP TSG RAN WG1 Meeting #89,R1-1707113, Codebook based UL transmission,Hangzhou, P.R. China May 15, 19, 2017,ZTE,total 5 pages.

3GPP TS 38.211 V16.2.0 (Jun. 2020), 3rd Generation Partnership Project; Technical Specification Group Radio Access Network; NR; Physical channels and modulation(Release 16), 131 pages.

3GPP TS 38.212 V16.2.0 (Jun. 2020), 3rd Generation Partnership Project; Technical Specification Group Radio Access Network; NR; Multiplexing and channel coding(Release 16), 151 pages.

3GPP TS 38.331 V16.1.0 (Jul. 2020), 3rd Generation Partnership Project; Technical Specification Group Radio Access Network; NR; Radio Resource Control (RRC) protocol specification(Release 16), 906 pages.

Samsung, Codebook-based UL transmission. 3GPP TSG RAN WG1 Meeting #90bis, Prague, P.R. Czechia, Oct. 9-13, 2017, R1-1717595, 12 pages.

Extended European Search Report issued in corresponding European Application No. 21851357.0, dated Dec. 6, 2023, pp. 1-13.

* cited by examiner (a) 4 dual-polarized antennas (equal spacing)

(b) 4 dual-polarized antennas (equal spacing)

(c) 4 single-polarized antennas (equal spacing)

(d) 8 dual-polarized antennas (equal spacing)

(e) 8 dual-polarized antennas (equal spacing)

(f) 8 dual-polarized antennas (unequal spacing)

COMMUNICATION METHOD AND APPARATUS

CROSS-REFERENCE TO RELATED APPLICATIONS

This application is a continuation of International Application No. PCT/CN2021/109225, filed on Jul. 29, 2021, which claims priority to Chinese Patent Application No. 202010752364.0, filed on Jul. 30, 2020. The disclosures of the aforementioned applications are hereby incorporated by reference in their entireties.

TECHNICAL FIELD

This application relates to the field of communication technologies, and in particular, to a communication method and apparatus.

BACKGROUND

In wireless communication systems, for example, a fourth generation (4G) wireless communication system and a fifth generation (5G) wireless communication system (where the 5G system is a new radio access technology (NR) system), for uplink (UL) transmission, the diversity and multiplexing gain can be achieved by uplink precoding. In the 5G system, uplink precoding includes a codebook-based transmission mode and a non-codebook-based transmission mode. The codebook-based transmission mode may be applied to frequency division duplex (FDD) and (TDD) systems, while the codebook-based transmission mode is usually used in the TDD system. In the codebook-based transmission mode, a base station selects an appropriate codebook from a predefined uplink codebook set based on a channel state, and indicates an index of the selected codebook to a terminal through a control channel. In the non-codebook-based transmission mode, the base station selects an appropriate sounding reference signal resource index (SRI) based on a channel state, and indicates the SRI to the terminal through a control channel. However, in the 4G system, only the codebook-based transmission mode is supported in uplink transmission.

With the development of mobile communication and the emergence of new services, the demand for uplink capacity is increasing. For example, in some video surveillance scenarios, terminals need to upload high-definition videos to base stations. To increase the uplink capacity, the uplink transmission technology, especially the uplink multiple-input multiple-output (MIMO) technology, needs to be enhanced. In the existing 4G system or 5G system, an uplink codebook is prestored in a network device and a terminal device. A quantity of available codebooks is limited, and cannot be adjusted depending on antenna types of terminal devices. As a result, precision of the uplink codebook is not high enough, which affects performance of uplink MIMO transmission, and is unfavorable to increase of the uplink capacity.

SUMMARY

This application provides a communication method and apparatus, to improve precision of an uplink codebook.

According to a first aspect, this application provides a communication method. The method includes: A terminal device receives first information from a network device, where the first information indicates a precoding matrix; and the terminal device determines the precoding matrix based on the first information, where the precoding matrix is for sending an uplink signal, and is determined based on a first matrix and a second matrix. The first matrix is determined from a first matrix set based on the first information, where the first matrix set is determined based on a horizontal-dimension parameter of an antenna of the terminal device; and/or the second matrix is determined from a second matrix set based on the first information, where the second matrix set is determined based on a vertical-dimension parameter of the antenna.

According to the foregoing method, when the precoding matrix is determined, antenna configuration information of the terminal device is considered, precision of the precoding matrix may be adaptively adjusted, and different precoding matrix precision may be configured for antennas of different terminal devices. This helps reduce interference between MIMO paired users and satisfy capacity requirements of different terminal devices. In addition, a better beamforming gain may be obtained depending on types of antennas of different terminal devices. This helps the terminal device better match a channel when sending an uplink signal.

In a possible design, the method further includes: The terminal device receives second information from the network device, where the second information indicates a phase offset between antennas in different polarization directions of the terminal device. That the terminal device determines the precoding matrix based on the first information includes: The terminal device determines the precoding matrix based on the first information and the second information.

According to the foregoing method, impact caused by a phase offset between antennas in different polarization directions is considered for the precoding matrix. This helps the terminal device better match a channel when sending uplink data by using the precoding matrix, thereby obtaining a larger multi-antenna gain.

In a possible design, the precoding matrix W satisfies the following form:

$$W = \begin{bmatrix} v_{t,m} \\ v_{t,m} \cdot e^{j\theta} \end{bmatrix}$$

where $v_{t,m}$ is determined based on the first matrix and the second matrix, and $\theta$ is the phase offset.

In a possible design, the second information indicates an index value of the phase offset $\theta$ in a set $\{0, 2\pi/M, \ldots, 2\pi(M-1)/M\}$, where a phase quantization factor M is configured by the network device or preset.

In a possible design, the precoding matrix W satisfies the following form:

$$W = v_{t,m}$$

where $v_{t,m}$ is determined based on the first matrix and the second matrix.

In a possible design, v-m satisfies the following form:

$$v_{t,m} = \begin{bmatrix} u_m e^{j\frac{2\pi t}{O_1 N_1}} & \ldots & u_m e^{j\frac{2\pi t(N_1-1)}{O_1 N_1}} \end{bmatrix}$$

where $$u_m = \begin{bmatrix} 1 & e^{j\frac{2\pi m}{N_2 \cdot O_2}} & \ldots & e^{j\frac{2\pi m(N_2-1)}{N_2 \cdot O_2}} \end{bmatrix},$$

$N_1$ is a quantity of horizontal-dimension antenna ports, $O_1$ is a horizontal-dimension oversampling factor, $N_2$ is a quantity of vertical-dimension antenna ports, j is an imaginary number, $O_2$ is a vertical-dimension oversampling factor, m=0, 1, 2, ..., $N_2O_2-1$, and t=0, 1, 2, ..., $N_2O_2-1$.

The precoding matrix is determined based on the horizontal-dimension oversampling factor and the vertical-dimension oversampling factor, so that precision of the precoding matrix can be improved, and a better beamforming gain can be obtained based on different types of antennas.

In a possible design, the first information is transmitted via first signaling, and the second information is transmitted via second signaling; and the first information is valid in a first time unit, and the second information is valid in a second time unit, where the first time unit is greater than or equal to the second time unit.

In a possible design, the method further includes: The terminal device sends antenna configuration information to the network device, where the antenna configuration information includes a polarization type of the antenna of the terminal device, the horizontal-dimension parameter of the antenna, and the vertical-dimension parameter of the antenna.

In a possible design, the polarization type of the antenna includes at least one of single polarization, dual polarization, triple polarization, and elliptical polarization.

In a possible design, the horizontal-dimension parameter of the antenna includes the quantity of horizontal-dimension antenna ports; and the vertical-dimension parameter of the antenna includes the quantity of vertical-dimension antenna ports.

In a possible design, the horizontal-dimension parameter of the antenna further includes at least one of the following: a spacing between adjacent horizontal-dimension antennas and the horizontal-dimension oversampling factor; and the vertical-dimension parameter of the antenna further includes at least one of the following:

a spacing between adjacent vertical-dimension antennas and the vertical-dimension oversampling factor.

In a possible design, the first information indicates an index value of the first matrix and an index value of the second matrix; or the first information indicates an index value of the precoding matrix.

According to a second aspect, this application further provides an apparatus. The apparatus may be a terminal device, and the apparatus can implement a function in the method example in the first aspect or each possible design example in the first aspect. The function may be implemented by hardware, or may be implemented by hardware executing corresponding software. The hardware or the software includes one or more modules corresponding to the foregoing function.

In a possible design, a structure of the apparatus includes a communication unit and a processing unit. These units can implement a corresponding function in the first aspect or each possible design example of the first aspect. For details, refer to detailed descriptions in the method example. Details are not described herein again.

In a possible design, a structure of the apparatus includes a communication interface and a processor, and optionally further includes a memory. The communication interface is configured to send and receive data, and is configured to communicate and interact with another device in a communication system. The processor is configured to support the apparatus in implementing a corresponding function in the first aspect or each possible design method in the first aspect. The memory is coupled to the processor and stores program instructions and data that are necessary for the apparatus.

According to a third aspect, this application further provides a method, including: A network device receives antenna configuration information from a terminal device, where the antenna configuration information includes an antenna parameter for determining a precoding matrix; the network device measures a reference signal from the terminal device, to obtain a channel measurement result; and the network device determines the precoding matrix based on the channel measurement result and the antenna configuration information, and sends first information to the terminal device, where the first information indicates the precoding matrix; the precoding matrix is determined based on a first matrix and a second matrix; the first matrix is determined from a first matrix set based on the channel measurement result, where the first matrix set is determined based on a horizontal-dimension parameter of an antenna of the terminal device; and the second matrix is determined from a second matrix set based on the channel measurement result, where the second matrix set is determined based on a vertical-dimension parameter of the antenna.

According to the foregoing method, when the precoding matrix is determined, antenna configuration information of the terminal device is considered, precision of the precoding matrix may be adaptively adjusted, and different precoding matrix precision may be configured for antennas of different terminal devices. This helps reduce interference between MIMO paired users and satisfy capacity requirements of different terminal devices. In addition, a better beamforming gain may be obtained based on types of antennas of different terminal devices. This helps the terminal device better match a channel when sending an uplink signal.

In a possible design, the method further includes: The network device sends second information to the terminal device, where the second information indicates a phase offset between antennas in different polarization directions of the terminal device.

In a possible design, the precoding matrix W satisfies the following form:

$$W = \begin{bmatrix} v_{t,m} \\ v_{t,m} \cdot e^{j\theta} \end{bmatrix}$$

where $v_{t,m}$ is determined based on the first matrix and the second matrix, and $\theta$ is the phase offset.

In a possible design, the second information indicates an index value of the phase offset $\theta$ in a set $\{0, 2\pi/M, \ldots, 2\pi(M-1)/M\}$, where a phase quantization factor M is configured by the network device or preset.

In a possible design, the precoding matrix W satisfies the following form:

$$W = v_{t,m}$$

where $v_{t,m}$ is determined based on the first matrix and the second matrix.

In a possible design, $v_{t,m}$ satisfies the following form:

$$v_{t,m} = \begin{bmatrix} u_m e^{j\frac{2\pi t}{O_1 N_1}} & \ldots & u_m e^{j\frac{2\pi t(N_1-1)}{O_1 N_1}} \end{bmatrix}$$

where $$u_m = \begin{bmatrix} 1 & e^{j\frac{2\pi m}{N_2 \cdot O_2}} & \ldots & e^{j\frac{2\pi m(N_2-1)}{N_2 \cdot O_2}} \end{bmatrix},$$

$N_1$ is a quantity of horizontal-dimension antenna ports, $O_1$ is a horizontal-dimension oversampling factor, $N_2$ is a quantity of vertical-dimension antenna ports, j is an imaginary number, $O_2$ is a vertical-dimension oversampling factor, m=0, 1, 2, ..., $N_2 O_2 - 1$, and t=0, 1, 2, ..., $N_2 O_2 - 1$.

In a possible design, the first information is transmitted via first signaling, and the second information is transmitted via second signaling; and the first information is valid in a first time unit, and the second information is valid in a second time unit, where the first time unit is greater than or equal to the second time unit.

In a possible design, the method further includes: The terminal device sends antenna configuration information to the network device, where the antenna configuration information includes a polarization type of the antenna of the terminal device, the horizontal-dimension parameter of the antenna, and the vertical-dimension parameter of the antenna.

In a possible design, the polarization type of the antenna includes at least one of single polarization, dual polarization, triple polarization, and elliptical polarization.

In a possible design, the horizontal-dimension parameter of the antenna includes the quantity of horizontal-dimension antenna ports; and the vertical-dimension parameter of the antenna includes the quantity of vertical-dimension antenna ports.

In a possible design, the horizontal-dimension parameter of the antenna further includes at least one of the following: a spacing between adjacent horizontal-dimension antennas and the horizontal-dimension oversampling factor; and the vertical-dimension parameter of the antenna further includes at least one of the following:

a spacing between adjacent vertical-dimension antennas and the vertical-dimension oversampling factor.

In a possible design, the first information indicates an index value of the first matrix and an index value of the second matrix; or the first information indicates an index value of the precoding matrix.

According to a fourth aspect, this application further provides an apparatus. The apparatus may be a network device, and the apparatus can implement a function in the method example in the third aspect or each possible design example in the third aspect. The function may be implemented by hardware, or may be implemented by hardware executing corresponding software. The hardware or the software includes one or more modules corresponding to the foregoing function.

In a possible design, a structure of the apparatus includes a communication unit and a processing unit. These units can implement a corresponding function in the third aspect or each possible design example of the third aspect. For details, refer to detailed descriptions in the method example. Details are not described herein again.

In a possible design, a structure of the apparatus includes a communication interface and a processor, and optionally further includes a memory. The transceiver is configured to send and receive data, and is configured to communicate and interact with another device in a communication system. The processor is configured to support the apparatus in implementing a corresponding function in the third aspect or each possible design method in the third aspect. The memory is coupled to the processor and stores program instructions and data that are necessary for the apparatus.

According to a fifth aspect, a computer-readable storage medium is provided, and is configured to store a computer program. The computer program includes instructions for performing the method in the first aspect or any possible implementation in the first aspect.

According to a sixth aspect, a computer-readable storage medium is provided, and is configured to store a computer program. The computer program includes instructions for performing the method in the third aspect or any possible implementation in the third aspect.

According to a seventh aspect, a computer program product is provided. The computer program product includes computer program code. When the computer program code is run on a computer, the computer is enabled to perform the method in the first aspect or any possible implementation in the first aspect.

According to an eighth aspect, a computer program product is provided. The computer program product includes computer program code. When the computer program code is run on a computer, the computer is enabled to perform the method in the third aspect or any possible implementation in the third aspect.

According to a ninth aspect, this application provides a communication apparatus. The communication apparatus includes a processor. When the processor executes a computer program or instructions in a memory, the method according to the first aspect is performed.

According to a tenth aspect, this application provides a communication apparatus. The communication apparatus includes a processor. When the processor executes a computer program or instructions in a memory, the method according to the third aspect is performed.

According to an eleventh aspect, this application provides a communication apparatus. The communication apparatus includes a processor and a memory. The memory is configured to store a computer program or instructions, and the processor is configured to execute the computer program or the instructions stored in the memory, to enable the communication apparatus to perform the corresponding method according to the first aspect.

According to a twelfth aspect, this application provides a communication apparatus. The communication apparatus includes a processor and a memory. The memory is configured to store a computer program or instructions, and the processor is configured to execute the computer program or the instructions stored in the memory, to enable the communication apparatus to perform the corresponding method according to the third aspect.

According to a thirteenth aspect, this application provides a communication apparatus. The communication apparatus includes a processor, a memory, and a communication interface. The communication interface is configured to receive a signal or send a signal. The memory is configured to store a computer program or instructions. The processor is configured to invoke the computer program or the instructions from the memory to perform the method according to the first aspect.

According to a fourteenth aspect, this application provides a communication apparatus. The communication apparatus includes a processor, a memory, and a communication interface. The communication interface is configured to receive a signal or send a signal. The memory is configured to store a computer program or instructions. The processor is configured to invoke the computer program or the instructions from the memory to perform the method according to the third aspect.

According to a fifteenth aspect, this application provides a chip, including a processor. The processor is coupled to a memory, and is configured to execute a computer program or instructions stored in the memory. When the processor executes the computer program or the instructions, the method according to the first aspect is implemented.

According to a sixteenth aspect, this application provides a chip, including a processor. The processor is coupled to a memory, and is configured to execute a computer program or instructions stored in the memory. When the processor executes the computer program or the instructions, the method according to the third aspect is implemented.

According to a seventeenth aspect, this application provides a system. The system includes the communication apparatus provided in the second aspect and the communication apparatus provided in the fourth aspect.

DESCRIPTION OF EMBODIMENTS

The following describes embodiments of this application in detail with reference to the accompanying drawings of this specification.

Embodiments of this application may be applied to various mobile communication systems, for example, a new radio (NR) system, a long term evolution (LTE) system, an advanced long term evolution (LTE-A) system, an evolved long term evolution (eLTE) system, and another communication system such as a future communication system. Specifically, this is not limited herein.

Figure 1:
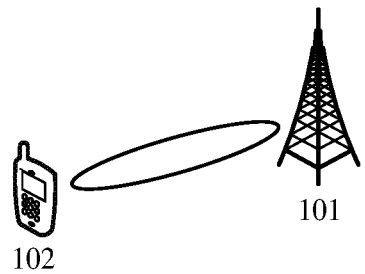
FIG. 1 is a schematic diagram of a system architecture according to an embodiment of this application.

For ease of understanding embodiments of this application, a communication system shown in FIG. 1 is first used as an example to describe in detail a communication system to which embodiments of this application are applicable. FIG. 1 is a schematic diagram of a communication system to which embodiments of this application are applicable. In FIG. 1, a terminal device 102 accesses a network device 101. The network device 101 may determine, according to a method provided in embodiments of this application, a precoding matrix for sending a downlink signal to the terminal device 102. Correspondingly, the terminal device 102 may determine, according to a method provided in embodiments of this application, a precoding matrix for sending an uplink signal to the network device 101.

A terminal device in embodiments of this application may be a device having a wireless transceiver function or a chip that can be disposed in any device, or may also be referred to as user equipment (UE), an access terminal, a subscriber unit, a subscriber station, a mobile station, a remote station, a remote terminal, a mobile device, a user terminal, a wireless communication device, a user agent, or a user apparatus. The terminal device in embodiments of this application may be a mobile phone, a tablet computer, a computer having a wireless transceiver function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like.

The network device may be a next-generation NodeB (gNB) in an NR system, may be an evolved NodeB (eNB) in an LTE system, or may be a base station in a future mobile communication system or the like.

In addition, the term "example" in embodiments of this application represents giving an example, an illustration, or a description. Any embodiment or design scheme described as an "example" in this application should not be explained as being more preferred or having more advantages than another embodiment or design scheme. Exactly, the term "example" presents a concept in a specific manner.

A network architecture and a service scenario described in embodiments of this application are intended to describe the technical solutions in embodiments of this application more clearly, and do not constitute any limitation on the technical solutions provided in embodiments of this application. A person of ordinary skill in the art may know that with evolution of the network architecture and emergence of a new service scenario, the technical solutions provided in embodiments of this application are also applicable to similar technical problems.

Before the method provided in embodiments of this application is described, a precoding matrix-related technology in embodiments of this application is first described. In MIMO transmission, a to-be-sent signal is precoded by using a precoding matrix at a transmitting end, so that spatial diversity and spatial multiplexing can be implemented. Spatial diversity helps improve signal transmission reliability, and spatial multiplexing helps transmit multiple parallel data streams at the same time. For both spatial diversity and spatial multiplexing, the precoding matrix needs to match a channel well. In uplink codebook-based transmission, a precoding matrix is determined on a network device side. If the network device directly indicates each element in the precoding matrix to the terminal device via signaling, signaling overheads are high. Therefore, in the existing standard, the network device may send a transmit precoding matrix indicator (TPMI) to the terminal device, the TPMI may indicate an index of a precoding matrix, and each index corresponds to a precoding matrix in a codebook.

Figure 2:
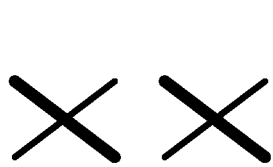
FIG. 2 is a schematic diagram of antenna arrangement according to an embodiment of this application.
Figure 2:
Figure 2:
Figure 2:
Figure 2:
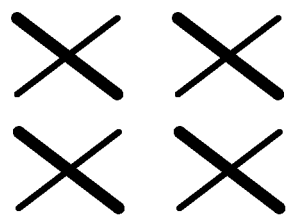
Figure 2:

When a plurality of antennas are configured for the terminal device, an arrangement manner of the antennas affects a codebook design, for example, whether the antennas are equally spaced and whether the antennas are polarized in a same way. FIG. 2 is a schematic diagram of an arrangement manner of antennas according to an embodiment of this application. (a) in FIG. 2, (b) in FIG. 2, and (c) in FIG. 2 provide possible arrangement positions of four antennas, and further show polarization directions of the antennas. (d) in FIG. 2 and (e) in FIG. 2 provide arrangement positions of eight antennas, and spacings between antennas in a horizontal dimension or a vertical dimension are the same. Spacings between antennas in a horizontal dimension in (f) in FIG. 2 are different. It is assumed that radio signals are transmitted or incident by plane waves. When the spacings between the antennas are the same, phase differences between signals arriving at adjacent antennas are the same. When the spacings between the antennas are different, phase differences between adjacent antennas may be different. For antennas in a same polarization direction, a narrow beam may usually be formed by adjusting a phase difference between antennas, so as to obtain a high beamforming gain. However, antennas in different polarization directions have a large phase difference, and are usually not combined for beamforming. In this embodiment of this application, in a precoding matrix determining process, an antenna type parameter of the terminal device may be considered to generate a high-precision codebook, so as to obtain an optimal beamforming gain.

In this embodiment of this application, the precoding matrix is generated according to a method for generating a codebook based on discrete Fourier transform (DFT). A DFT matrix obtained according to the method for generating a codebook based on a DFT matrix may be represented as follows:

$$A = \frac{1}{\sqrt{N}} \begin{bmatrix} 1 & e^{-j0\cdot(2\pi/N)} & e^{-j0\cdot(2\pi\cdot 2/N)} & \ldots & e^{-j0\cdot(2\pi\cdot(N-1)/N)} \\ \ldots & \ldots & \ldots & \ldots & \ldots \\ 1 & e^{-jn\cdot(2\pi/N)} & e^{-jn\cdot(2\pi\cdot 2/N)} & \ldots & e^{-jn\cdot(2\pi\cdot(N-1)/N)} \\ \ldots & \ldots & \ldots & \ldots & \ldots \\ 1 & e^{-j(N-1)\cdot(2\pi/N)} & e^{-j(N-1)\cdot(2\pi\cdot 2/N)} & \ldots & e^{-j(N-1)\cdot(2\pi\cdot(N-1)/N)} \end{bmatrix}^T \quad (1)$$

N indicates a quantity of antenna ports. Columns in the foregoing matrix are orthogonal to each other. When a codebook set is formed, one or more columns in the codebook set may be selected to determine the precoding matrix. Each column may be considered as corresponding to one beam direction, and selecting different columns is equivalent to selecting different beam directions for beamforming. Oversampling may be used for increasing beam directions, that is, increasing a size of a codebook set, thereby improving codebook precision. In addition, based on the antenna arrangement shown in FIG. 2, a quantity of horizontal-dimension antenna ports is defined as $N_1$, and a quantity of vertical-dimension antenna ports is defined as $N_2$. A horizontal-dimension oversampling factor is defined as $O_1$, and a vertical-dimension oversampling factor is defined as $O_2$ Beams in the horizontal and vertical dimensions are generated independently, and correspond to different parameters. Using horizontal-dimension antenna ports as an example below, a DFT matrix in the horizontal dimension after oversampling may be represented as:

$$A_1 = \frac{1}{\sqrt{N_1}} \begin{bmatrix} 1 & e^{-j0\left(\frac{2\pi}{N_1 \cdot O_1}\right)} & e^{-j0\left(\frac{2\pi \cdot 2}{N_1 \cdot O_1}\right)} & \ldots & e^{-j0\left(2\pi \cdot \frac{N_1-1}{N_1 \cdot O_1}\right)} \\ \ldots & \ldots & \ldots & \ldots & \ldots \\ 1 & e^{-jn\left(\frac{2\pi}{N_1 \cdot O_1}\right)} & e^{-jn\left(\frac{2\pi \cdot 2}{N_1 \cdot O_1}\right)} & \ldots & e^{-jn\left(2\pi \cdot \frac{N_1-1}{N_1 \cdot O_1}\right)} \\ \ldots & \ldots & \ldots & \ldots & \ldots \\ 1 & e^{-j(N_1-1)\left(\frac{2\pi}{N_1 \cdot O_1}\right)} & e^{-j(N_1-1)\left(\frac{2\pi \cdot 2}{N_1 \cdot O_1}\right)} & \ldots & e^{-j(N_1-1)\left(2\pi \cdot \frac{N_1-1}{N_1 \cdot O_1}\right)} \end{bmatrix}^T \quad (2)$$

After oversampling, a quantity of columns of the DFT matrix increases, that is, a quantity of available codebooks increases, and a quantity of available beam directions increases. This helps better match a channel and obtain a higher beamforming gain.

Using an example in which vertical-dimension antenna ports may be obtained when $N_1$ and $O_1$ in the foregoing formula are respectively replaced with the quantity $N_2$ of vertical-dimension antenna ports and the vertical-dimension oversampling factor $O_2$, a vertical-dimension DFT matrix obtained through oversampling may be represented as:

$$A_2 = \frac{1}{\sqrt{N_2}} \begin{bmatrix} 1 & e^{-j0\left(\frac{2\pi}{N_2 \cdot O_2}\right)} & e^{-j0\left(\frac{2\pi \cdot 2}{N_2 \cdot O_2}\right)} & \ldots & \ldots & e^{-j0\left(2\pi \cdot \frac{N_2-1}{N_2 \cdot O_2}\right)} \\ \ldots & \ldots & \ldots & \ldots & \ldots & \ldots \\ 1 & e^{-jn\left(\frac{2\pi}{N_2 \cdot O_2}\right)} & e^{-jn\left(\frac{2\pi \cdot 2}{N_2 \cdot O_2}\right)} & \ldots & \ldots & e^{-jn\left(2\pi \cdot \frac{N_2-1}{N_2 \cdot O_2}\right)} \\ \ldots & \ldots & \ldots & \ldots & \ldots & \ldots \\ 1 & e^{-j(N_2-1)\left(\frac{2\pi}{N_2 \cdot O_2}\right)} & e^{-j(N_2-1)\left(\frac{2\pi \cdot 2}{N_2 \cdot O_2}\right)} & \ldots & \ldots & e^{-j(N_2-1)\left(2\pi \cdot \frac{N_2-1}{N_2 \cdot O_2}\right)} \end{bmatrix} \quad (3)$$

In this embodiment of this application, a column of vectors may be separately selected from formula (2) and formula (3) to construct the precoding matrix. The following mainly describes a precoding matrix construction process by using an example in which single-stream transmission is performed, that is, a rank is equal to 1.

$$u_m = \begin{bmatrix} 1 & e^{j\cdot\frac{2\pi m}{N_2 \cdot O_2}} & \ldots & e^{j\cdot\frac{2\pi m(N_2-1)}{N_2 \cdot O_2}} \end{bmatrix}$$

is defined as a conjugate quantity of a vector in the $m^{th}$ column of a matrix $A_2$, where $m = 0, 1, 2, \ldots, N_2 O_2 - 1$.

$$u_t = \begin{bmatrix} 1 & e^{j\cdot\frac{2\pi t}{N_1 \cdot O_1}} & \ldots & e^{j\cdot\frac{2\pi t(N_1-1)}{N_1 \cdot O_1}} \end{bmatrix}$$

is defined as a conjugate quantity of a vector in the $t^{th}$ column of the matrix $A_1$, where $t=0, 1, 2, \ldots N_1 O_1 - 1$. When $N_2=1$, $u_m=1$, that is, beamforming does not need to be performed in a vertical dimension. Assuming that a quantity of antenna ports in one polarization direction is $N_1 \cdot N_2$, for single-layer transmission, a precoding matrix $v_{t,m}$ (a matrix dimension is $N_1 \cdot N_2 * 1$) formed in a same polarization direction is defined as follows:

$$v_{t,m} = \left[ u_m e^{j\frac{2\pi t}{O_1 N_1}} \quad \ldots \quad u_m e^{j\frac{2\pi t(N_1-1)}{O_1 N_1}} \right] \quad (4)$$

The formula (4) is determined based on a conjugate quantity of a vector in the $t^{th}$ column of the matrix $A_1$ and a conjugate quantity of a vector in the $m^{th}$ column of the matrix $A_2$, where t=0, 1, 2, . . . , $N_1 O_1 - 1$.

If the terminal device uses a dual-polarized antenna, and a quantity of antenna ports is $2 \cdot N_1 \cdot N_2$, when single-layer transmission is used, a corresponding precoding matrix W satisfies the following formula:

$$v = \begin{bmatrix} v_{t,m} \\ v_{t,m} \cdot e^{j\theta} \end{bmatrix} \quad (5)$$

In the foregoing formula, the first $N_1 \cdot N_2$ rows correspond to weights of corresponding antenna ports in a first polarization direction, and the last $N_1 \cdot N_2$ rows correspond to weights of corresponding antenna ports in a second polarization direction. A phase offset between antennas in different polarization directions is $\theta=0$:

$$\frac{2\pi}{M} : \frac{(M-1) \cdot 2\pi}{M}.$$

For example, when M=4, a value of $\theta$ is a value in a set $$\left\{ 0, \frac{\pi}{2}, \pi, \frac{3\pi}{2} \right\};$$

or when M=8, a value of $\theta$ is a value in a set $$\left\{ 0, \frac{\pi}{4}, \frac{\pi}{2}, \frac{3\pi}{4}, \pi, \frac{5\pi}{4}, \frac{3\pi}{2}, \frac{7\pi}{4} \right\}.$$

The phase offset indicates a phase difference between different polarized antennas.

It can be learned from the formula (5) that the terminal device can generate a corresponding precoding matrix only if the network device indicates an index (which may be understood as a beam direction) of $v_{t,m}$ and the phase offset $\theta$ between antennas in different polarization directions to the terminal device.

With reference to the foregoing description, the matrix $A_1$ includes $N_1 \cdot O_1$ column vectors, the matrix $A_2$ includes $N_2 \cdot O_2$ column vectors, and the phase offset $\theta$ has M possible values. In this case, a total quantity of codebooks included in the codebook set determined according to the formula (5) is $M \cdot N_1 \cdot O_1 \cdot N_2 \cdot O_2$.

It should be noted that the network device may measure a reference signal from the terminal device to obtain a channel measurement result, and determine the indexes t and m and the value of the phase offset $\theta$ based on the channel measurement result, to determine the precoding matrix.

It should be noted that when the antennas of the terminal device have only one polarization direction, that is, the antennas are single-polarized antennas, there is no phase offset between different antennas, that is, the precoding matrix W satisfies the following formula:

$$W = v_{t,m} \quad (6)$$

In this case, the network device needs to indicate only an index of $v_{t,m}$. In addition, when there are two antenna ports and the antenna is in a dual-polarized antenna, $N_1=N_2=1$. In this case, $v_{t,m}$ is 1, $v_{t,m}$ does not need to be indicated, and only $\theta$ needs to be indicated.

With reference to the foregoing description, the matrix $A_1$ includes $N_1 \cdot O_1$ column vectors, and the matrix $A_2$ includes $N_2 \cdot O_2$ column vectors. In this case, a total quantity of codebooks included in the codebook set determined according to the formula (6) is $N_1 \cdot O_1 \cdot N_2 \cdot O_2$.

The foregoing precoding matrix generation manner is applicable to uplink transmission with two antenna ports, four antenna ports, six antenna ports, eight antenna ports, or more antenna ports.

Figure 3:
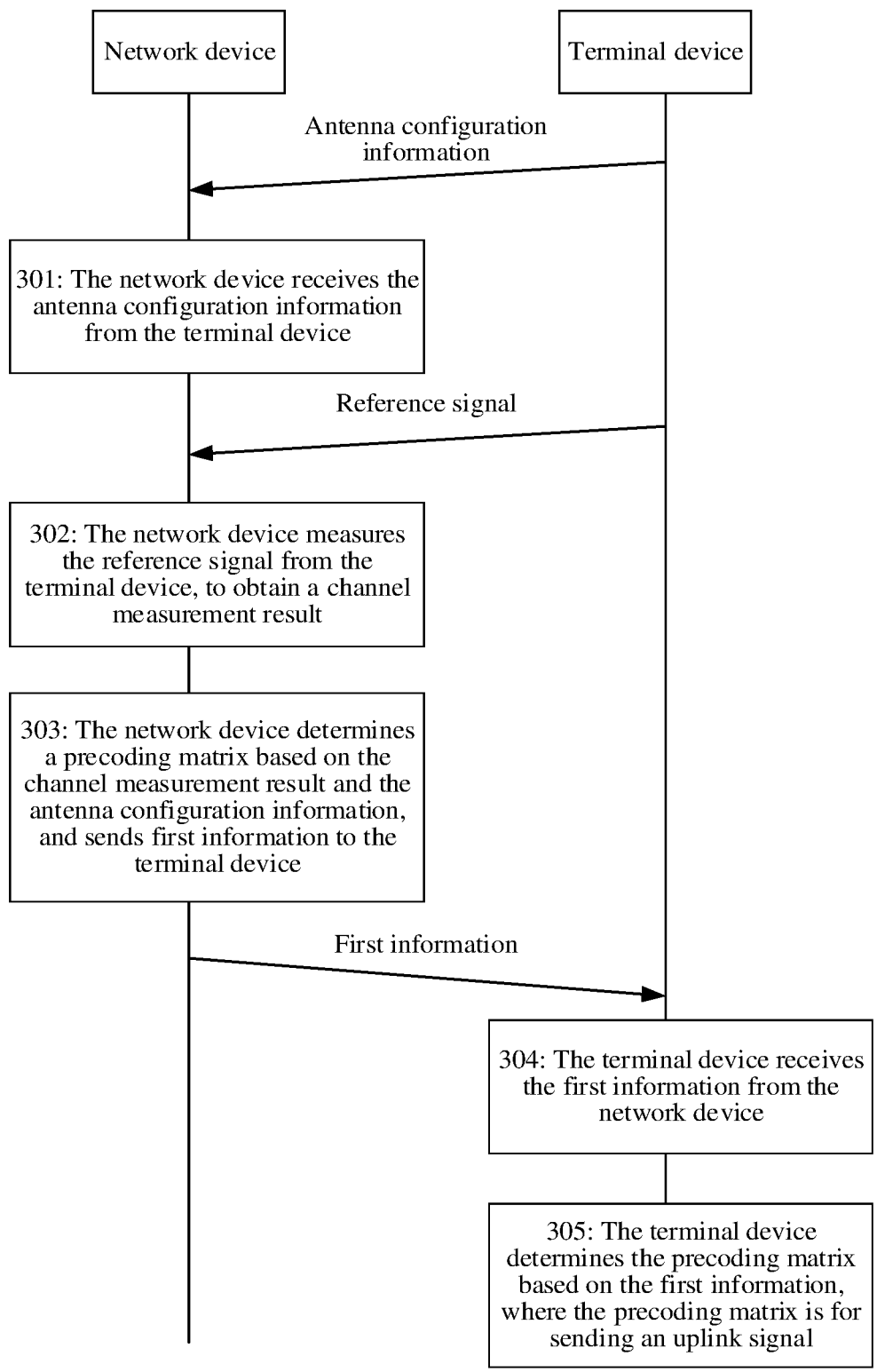
FIG. 3 is a schematic flowchart of a communication method according to an embodiment of this application.

With reference to the foregoing descriptions, FIG. 3 is a schematic flowchart of a communication method according to an embodiment of this application. The method includes the following steps.

Step 301: A network device receives antenna configuration information from a terminal device.

The antenna configuration information includes an antenna parameter for determining a precoding matrix.

Step 302: The network device measures a reference signal from the terminal device, to obtain a channel measurement result.

Step 303: The network device determines a precoding matrix based on the channel measurement result and the antenna configuration information, and sends first information to the terminal device.

The first information indicates the precoding matrix, and the precoding matrix is determined based on a first matrix and a second matrix. On a network device side, the first matrix is determined from a first matrix set based on the channel measurement result, where the first matrix set is determined based on a horizontal-dimension parameter of an antenna of the terminal device; and the second matrix is determined from a second matrix set based on the channel measurement result, where the second matrix set is determined based on a vertical-dimension parameter of the antenna.

Step 304: The terminal device receives the first information from the network device.

Step 305: The terminal device determines the precoding matrix based on the first information, where the precoding matrix is for sending an uplink signal.

The precoding matrix is determined based on a first matrix and a second matrix. On the terminal device side, the first matrix is determined from a first matrix set based on the first information, where the first matrix set is determined based on a horizontal-dimension parameter of an antenna of the terminal device; and/or the second matrix is determined from a second matrix set based on the first information, where the second matrix set is determined based on a vertical-dimension parameter of the antenna.

In the solution provided in this application, the network device indicates the precoding matrix, and the terminal device determines the precoding matrix based on the indication information. When the precoding matrix is determined, antenna configuration information of the terminal device is considered, precision of the precoding matrix may be adaptively adjusted, and different precoding matrix precision may be configured for antennas of different terminal devices. This helps reduce interference between MIMO paired users and satisfy capacity requirements of different terminal devices. In addition, a better beamforming gain may be obtained based on types of antennas of different terminal devices. This helps the terminal device better match a channel when sending an uplink signal.

In step 301, the antenna configuration information may include a polarization type of the antenna of the terminal device, the horizontal-dimension parameter of the antenna, and the vertical-dimension parameter of the antenna.

The polarization type of the antenna includes at least one of single polarization, dual polarization, triple polarization, and elliptical polarization.

The horizontal-dimension parameter of the antenna includes at least a quantity of horizontal-dimension antenna ports, and may further include at least one of a spacing between adjacent horizontal-dimension antennas and a horizontal-dimension oversampling factor. If the horizontal-dimension parameter of the antenna does not include a spacing between adjacent horizontal-dimension antennas, a value of the parameter may be a default value. If the horizontal-dimension parameter of the antenna does not include a horizontal-dimension oversampling factor, the network device may further independently determine the horizontal-dimension oversampling factor.

The vertical-dimension parameter of the antenna includes at least a quantity of vertical-dimension antenna ports, and may further include at least one of a spacing between adjacent vertical-dimension antennas and a vertical-dimension oversampling factor. If the vertical-dimension parameter of the antenna does not include a spacing between adjacent vertical-dimension antennas, a value of the parameter may be a default value. If the vertical-dimension parameter of the antenna does not include a vertical-dimension oversampling factor, the network device may further independently determine the vertical-dimension oversampling factor.

It should be noted that the horizontal-dimension oversampling factor and the vertical-dimension oversampling factor that are reported by the terminal device may be a maximum capability that can be supported by the terminal device. The network device may not use the horizontal-dimension oversampling factor and the vertical-dimension oversampling factor that are reported by the terminal device. In this case, the network device may indicate the horizontal-dimension oversampling factor and the vertical-dimension oversampling factor to the terminal device by using radio resource control (RRC) signaling.

For example, the horizontal-dimension oversampling factor reported by the terminal device is 10, and the vertical-dimension oversampling factor reported by the terminal device is 10. When determining the precoding matrix, the network device may comprehensively consider codebook precision and the like, determine that the horizontal-dimension oversampling factor and the vertical-dimension oversampling factor that are used for generating the precoding matrix are 8, and indicate the horizontal-dimension oversampling factor and the vertical-dimension oversampling factor to the terminal device by using RRC signaling.

Further, how the terminal device specifically sends the antenna configuration information is not limited in this embodiment of this application. For example, the terminal device may use a user equipment capability information element (UE capability information elements) in radio resource control (RRC) signaling to carry the antenna configuration information. In a process in which the terminal device performs random access, the antenna configuration information may be reported to the network device. For example, an information indicator may be added to the UE capability information elements to indicate the antenna configuration information, for example, named as a user equipment antenna configuration information element (UE antenna configuration information element). A specific structure of the UE antenna configuration information element may be shown as follows:

```
UE-antenna-configuration ::=            SEQUENCE {
antennaPortForHorizontal                ENUMERATED {n2, n3, n4, n6, n8};
antennaPortForVertical                    ENUMERATED {n2, n3, n4, n6, n8};
overSampleFactorForHorizontal             ENUMERATED {n1, n2, n4, n6, n8};
overSampleFactorForVertical               ENUMERATED {n1, n2, n4, n6, n8};
polarizationNumber                      ENUMERATED {n1, n2};
antennaSpacingForHorizontal               INTEGER (1..32);
antennaSpacingForVertical                 INTEGER (1..32);
}
``` antennaPortForHorizontal represents a quantity of horizontal-dimension antenna ports. For example, a candidate value set may be {2, 3, 4, 6, 8} or the like. "ENUMERATED" indicates that the parameter is of an enumeration type, that is, a value is selected from the candidate set for reporting. antennaPortForVertical represents a quantity of vertical-dimension antenna ports. For example, a candidate value set may be {2, 3, 4, 6, 8} or the like. overSampleFactorForHorizontal represents a horizontal-dimension oversampling factor, and a value set is {1, 2, 4, 6, 8} or the like. overSampleFactorForVertical represents a vertical-dimension oversampling factor, and a value set may be {1, 2, 4, 6, 8} or the like. polarizationNumber represents a quantity of polarization directions, and a value set is {1, 2}. antennaSpacingForHorizontal represents a spacing between adjacent horizontal-dimension antennas, and a value thereof is an integer ranging from 1 to 32 in unit of 0.1 wavelengths. This parameter is optional and does not need to be reported. antennaSpacingForVertical represents a spacing between adjacent vertical-dimension antennas, and a value thereof is an integer ranging from 1 to 32 in unit of 0.1 wavelengths. This parameter is optional and does not need to be reported.

It should be noted that the foregoing value sets are merely examples, and there may also be another value. The parameter configuration included in the UE antenna configuration information element may also be included in another information element, for example, may be located in a MIMO-ParametersPerBand information element (MIMO-ParametersPerBand information element), which is not limited herein.

Further, a type of the precoding matrix in this embodiment of this application may be a high-precision precoding matrix. When the network device further determines, based on the capability of the terminal device, that the terminal device supports sending of the uplink signal by using the high-precision precoding matrix, the network device may indicate the terminal device to generate the high-precision precoding matrix. Otherwise, the network device indicates the terminal device to determine the precoding matrix in a manner in the current technology.

Further, as described above, a value range of the phase offset θ is related to a phase quantization factor M. For example, when M=4, a value set of θ is $$\left\{0, \frac{\pi}{2}, \pi, \frac{3\pi}{2}\right\}.$$

A value of M may be a default value, or may be a value configured by the network device. The network device configures the phase quantization factor M, and may further indicate the phase quantization factor M to the terminal device.

In addition, the network device may further configure a horizontal-dimension oversampling factor $O_1$ and a vertical-dimension oversampling factor $O_2$ for the terminal device. If the antenna configuration information reported by the terminal device includes $O_1$ and $O_2$, the network device may determine values of $O_1$ and $O_2$ by comprehensively considering a size of room for performance improvement caused by codebook precision and signaling indication overheads. The value of $O_1$ indicated by the network device is less than or equal to the value of the horizontal-dimension oversampling factor reported by the terminal device, and the value of $O_2$ indicated by the network device is less than or equal to the value of the vertical-dimension oversampling factor reported by the terminal device. If $O_1$ and $O_2$ are not configured for the terminal device, the values reported by the terminal are used.

The network device may indicate M, $O_1$, and $O_2$ by using RRC signaling, for example, by using a physical uplink shared channel (PUSCH) configuration information element (IE) in RRC signaling. For a structure of the PUSCH-Config IE, refer to the following:

```
-- ASN1START
-- TAG-PUSCH-CONFIG-START
PUSCH-Config ::=                SEQUENCE {
    dataScramblingIdentityPUSCH         INTEGER (0..1023)   OPTIONAL, -- Need S
txConfig  ENUMERATED {codebook, nonCodebook}  OPTIONAL, -- Need S
phaseQuantizationFactorForCodebook    ENUMERATED{n1, n2, n3, n4}
oversampleFactorForCodebook           SEQUENCE {
overSampleFactorForHorizontal             ENUMERATED {n1, n2, n4, n6, n8}
overSampleFactorForVertical               ENUMERATED {n1, n2, n4, n6, n8}
}
```

A method for indicating a phase quantization factor via signaling may be adding a parameter, phaseQuantizationFactorforCodebook (phaseQuantizationFactorforCodebook), to a PUSCH-Config IE, where phaseQuantizationFactorforCodebook is a parameter of an enumeration type, whose value set is, for example, {2, 4, 6, 8}. The PUSCH-Config is a UE-specific configuration, that is, the parameter may be configured for each terminal device. For example, when the phase quantization factor is set to 4, it indicates that a value of M is 4, that is, a phase between 0 and 2π is equally divided by 4. When the terminal device receives the indication value, the terminal device determines to send the PUSCH by using the high-precision precoding matrix.

Optionally, when an oversampling factor needs to be indicated, a parameter, oversampleFactorForCodebook, may be newly added to the PUSCH-Config IE, where two parameters may be included: overSampleFactorForHorizontal and overSampleFactorForVertical.

In step 302, the network device may receive a reference signal from the terminal device, for example, a sounding reference signal (SRS). The network device may measure the reference signal to obtain the channel measurement result.

How the network device specifically measures the reference signal and specific content of the measurement result are not limited in this embodiment of this application. For details, refer to descriptions in the current technology. Details are not described herein again.

In step 303, the network device may determine the first matrix set based on the horizontal-dimension parameter of the antenna of the terminal device, and determine the second matrix set based on the vertical-dimension parameter of the antenna of the terminal device. The first matrix set may satisfy the foregoing formula (2), and the second matrix set may satisfy the foregoing formula (3).

The network device may determine, from the first matrix set based on the channel measurement result, a column of vectors as the first matrix, where the first matrix may be $u_l$ described above; and determine, from the second matrix set based on the channel measurement result, a column of vectors as the second matrix, where the second matrix may be $u_m$ described above. It should be noted that how the network device specifically determines the first matrix and the second matrix is not limited in this embodiment of this application. For example, the network device may separately evaluate, with reference to a channel measurement result, all possible precoding matrices formed by the first matrix set and the second matrix set, and use a first matrix and a second matrix corresponding to a precoding matrix that maximizes a capacity as the determined first matrix and second matrix.

Further, when the antenna of the terminal device is a dual-polarized antenna, it can be learned from the formula (5) that the parameter for determining the precoding matrix further includes a phase offset θ between different antennas of the terminal device, and the network device may further determine the phase offset θ based on the channel measurement result. For example, the network device may determine precoding matrices corresponding to different phase offsets θ according to formula (5), separately perform evaluation with reference to a channel measurement result, and use a phase offset corresponding to a precoding matrix that maximizes a capacity as the determined phase offset θ.

With reference to the foregoing description, the network device may indicate the precoding matrix in at least two implementations. Implementation 1: The precoding matrix is indicated by only the first information. In this case, the first information may be an index value of the precoding matrix. Implementation 2: The precoding matrix is indicated by the first information and the second information. For example, it can be learned from formula (5) that three parameters are required for determining the precoding matrix: a first matrix, a second matrix, and a phase offset θ. In this implementation, the first information may indicate the first matrix and the second matrix, and the second information may indicate the phase offset θ, so as to indicate the precoding matrix. Details are described below.

In a possible implementation, the precoding matrix may be indicated by only the first information For example, each precoding matrix in the codebook set determined according to the foregoing formula (5) or formula (6) may be numbered, and each precoding matrix corresponds to one index value.

It can be learned from formula (6) that each precoding matrix is determined based on the first matrix and the second matrix. Alternatively, the first information may directly indicate an index value of the precoding matrix, or the first information may indicate an index value of the first matrix and an index value of the second matrix, so as to indicate the precoding matrix. This is not limited in this embodiment of this application.

For example, with reference to the foregoing description, it is assumed that the antenna of the terminal device is a single-polarized antenna. In this case, the precoding matrix may be determined according to formula (6). It is assumed that the index value of the first matrix is t, the index value of the second matrix is m, and value ranges thereof are both 0 to 2. In this case, all possible precoding matrices formed may be shown in Table 1. In Table 1, (1, 0) represents that the precoding matrix is determined based on a first matrix whose index value is 1 and a second matrix whose index value is 0, and other cases can be deduced by analogy.

TABLE 1

| First information | Index value of the precoding matrix | Precoding matrix (t, m) |
|---|---|---|
| 0000 | 0 | (0, 0) |
| 0001 | 1 | (0, 1) |
| 0010 | 2 | (0, 2) |
| 0011 | 3 | (1, 0) |
| 0100 | 4 | (1, 1) |
| 0101 | 5 | (1, 2) |
| 0110 | 6 | (2, 0) |
| 0111 | 7 | (2, 1) |
| 1000 | 8 | (2, 2) |

With reference to Table 1, for example, when the first information is 0111, it represents that an index value of a precoding matrix is 8, and the precoding matrix is determined based on a first matrix whose index value is 2 and a second matrix whose index value is 1. When the first information is 0111, the index value of the precoding matrix may be indicated, or the index value t of the first matrix and the index value m of the second matrix may be indicated. This is not limited in this embodiment of this application.

It can be learned from formula (5) that each precoding matrix may be determined based on the first matrix, the second matrix, and the phase offset. Alternatively, the first information may directly indicate the index value of the precoding matrix, or the first information may indicate the index value of the first matrix, the index value of the second matrix, and the index value of the phase offset, so as to indicate the precoding matrix. This is not limited in this embodiment of this application.

In another example, with reference to the foregoing description, it is assumed that the antenna of the terminal device is a dual-polarized antenna. In this case, the precoding matrix may be determined according to formula (5). It is assumed that the index value of the first matrix is t, the index value of the second matrix is m, value ranges thereof are both 0 to 1, and a phase quantization factor is 2. In this case, all possible precoding matrices formed may be shown in Table 2. In Table 2, (1, 0, π) represents that the precoding matrix is determined based on a first matrix whose index value is 1, a second matrix whose index value is 0, and a phase offset π, and other cases can be deduced by analogy.

TABLE 2

| First information | Index value of the precoding matrix | Precoding matrix (t, m, θ) |
|---|---|---|
| 0000 | 0 | (0, 0, 0) |
| 0001 | 1 | (0, 0, π) |
| 0010 | 2 | (0, 1, 0) |
| 0011 | 3 | (0, 1, π) |
| 0100 | 4 | (1, 0, 0) |
| 0101 | 5 | (1, 0, π) |
| 0110 | 6 | (1, 1, 0) |
| 0111 | 7 | (1, 1, π) |

With reference to Table 1, for example, when the first information is 0111, it represents that an index value of a precoding matrix is 8, and the precoding matrix is determined based on a first matrix whose index value is 2, a second matrix whose index value is 1, and a phase offset π. When the first information is 0111, the index value of the precoding matrix may be indicated, or the index value t of the first matrix, the index value m of the second matrix, and the index value of the phase offset may be indicated. This is not limited in this embodiment of this application.

In a possible implementation, the precoding matrix may be indicated by the first information and the second information. For example, the first matrix and the second matrix may be indicated by the first information, and the phase offset θ may be indicated by the second information.

It should be noted that, if the antenna of the terminal device is a single-polarized antenna, it may be learned from formula (6) that the precoding matrix may be determined based on the first information, and the second information is not required. If the antenna of the terminal device is a dual-polarized antenna, the second information indicates an index value of the phase offset θ in a set {0, 2π/M, . . . , 2π(M−1)/M}, where a phase quantization factor M is configured by the network device or preset.

In this case, it may be learned from formula (5) that the precoding matrix may be determined based on the first information and the second information.

In this implementation, there are two implementations of the first information. Manner 1: The first information includes a first part and a second part, the first part indicates the first matrix, and the second part indicates the second matrix. For example, the first part is the index value of the first matrix, and the second part is the index value of the second matrix. This manner is equivalent to that the first matrix and the second matrix are separately numbered, and the first information indicates respective index values of the first matrix and the second matrix.

For example, with reference to the foregoing description, assuming that the index value of the first matrix is t, and the index value of the second matrix is m, the first part of the first information may be shown in Table 3, and the second part of the first information may be shown in Table 4.

TABLE 3

| Index value t of the first matrix | First part of the first information |
|---|---|
| 0 | 000 |
| 1 | 001 |

TABLE 3-continued

| Index value t of the first matrix | First part of the first information |
|---|---|
| 2 | 010 |
| 3 | 011 |
| 4 | 100 |

TABLE 4

| Index value m of the second matrix | Second part of the first information |
|---|---|
| 0 | 000 |
| 1 | 001 |
| 2 | 010 |
| 3 | 011 |
| 4 | 100 |

With reference to Table 3 and Table 4, when t=2 and m=3, the first information may be 010 011. The first three bits in the first information represent the first part, and the last three bits represent the second part.

Manner 2: The first information indicates an index value obtained by jointly numbering the first matrix and the second matrix For example, the first information may be an index value of a matrix $v_{t,m}$ determined based on the first matrix and the second matrix.

It can be learned from formula (4) that the matrix $v_{t,m}$ is determined based on the first matrix and the second matrix, and indicating the index value of the matrix $v_{t,m}$ is equivalent to indicating t corresponding to the first matrix and m corresponding to the second matrix, that is, indicating the first matrix and the second matrix.

This manner is equivalent to jointly numbering the first matrix and the second matrix, and the index value of the matrix $v_{t,m}$ indicated by the first information may be equivalent to an index value obtained by jointly numbering the first matrix and the second matrix.

With reference to the foregoing description, the matrix $A_1$ includes $Q_1*N_1$ column vectors, and the matrix $A_2$ includes $Q_2*N_2$ column vectors. It can be learned from the formula (4) that there are a total of $N_1 \cdot O_1 \cdot N_2 \cdot O_2$ possible matrices $v_{t,m}$, and a value range of an index value of the matrix $v_{t,m}$ may be 0 to $N_1 \cdot O_1 \cdot N_2 \cdot O_2 - 1$.

In this manner, it may be learned from formula (6) that when the antenna of the terminal device is a single-polarized antenna, an index value of one precoding matrix may uniquely correspond to one index value indicated by the first information. In this case, the index value indicated by the first information may be equal to the index value of the precoding matrix.

For example, with reference to the foregoing description, it is assumed that the index value of the first matrix is t, the index value of the second matrix is m, and value ranges thereof are both 0 to 2. In this case, all possible precoding matrices formed may be shown in Table 5. In Table 5, (1, 0) represents that the precoding matrix is determined based on a first matrix whose index value is 1 and a second matrix whose index value is 0, and other cases can be deduced by analogy.

TABLE 5

| First information | Index value obtained by jointly numbering the first matrix and the second matrix | Precoding matrix (t, m) |
|---|---|---|
| 0000 | 0 | (0, 0) |
| 0001 | 1 | (0, 1) |
| 0010 | 2 | (0, 2) |
| 0011 | 3 | (1, 0) |
| 0100 | 4 | (1, 1) |
| 0101 | 5 | (1, 2) |
| 0110 | 6 | (2, 0) |
| 0111 | 7 | (2, 1) |
| 1000 | 8 | (2, 2) |

With reference to Table 5, for example, when the first information is 0111, it represents that the precoding matrix is determined based on a first matrix whose index value is 2 and a second matrix whose index value is 1.

In this embodiment of this application, when the network device sends the first information and the second information, the first information and the second information may be transmitted via same signaling, or may be transmitted via different signaling. For example, the network device may send the first information and the second information via downlink control information (DCI).

Further, when a channel changes slowly, a beam direction between the terminal device and the network device may also change slowly. Therefore, reducing a frequency of indicating the phase offset θ may be considered. This helps reduce signaling indication overheads. In some embodiments, the first information and the second information are transmitted via different signaling. The first information may be transmitted via the first signaling, and the second information may be transmitted via the second signaling. A sending period of the first information may be greater than or equal to a sending period of the second information, and the first signaling and the second signaling may be DCI.

For example, the first information is valid in a first time unit, and the second information is valid in a second time unit, where the first time unit is greater than or equal to the second time unit. In other words, the sending period of the first information may be the first time unit, and the sending period of the second information may be the second time unit.

It is assumed that the first information indicates an index value of a matrix $v_{t,m}$ determined based on the first matrix and the second matrix, that is, indicate an index value $i_1$ obtained by jointly numbering the first matrix and the second matrix, and the second information indicates an index value of the phase offset θ, and may indicate an index value $i_2$ of the phase offset θ in a set $\{0, 2\pi/M, \ldots, 2\pi(M-1)/M\}$. The network device may configure the sending period of the first information and the sending period of the second information via signaling.

For example, a parameter, tpmiPeriodForCodebook, may be added to the RRC signaling PUSCH-Config IE. The parameter may include two items: firstPartPeriod, indicating a sending period of the first information; and SecondPartPeriod, indicating a sending period of the second information. For details, refer to the following.

```
PUSCH-Config IE
-- ASN1START
-- TAG-PUSCH-CONFIG-START
PUSCH-Config ::=            SEQUENCE {
    dataScramblingIdentityPUSCH    INTEGER (0..1023)    OPTIONAL,    -- Need S
```

```
txConfig              ENUMERATED {codebook, nonCodebook}   OPTIONAL, --
Need S
   phaseQuantizationFactorForCodebook      ENUMERATED{n1, n2, n3, n4}
   oversampleFactorForCodebook       SEQUENCE {
      overSampleFactorForHorizontal     ENUMERATED {n1, n2, n4, n6, n8}
      overSampleFactorForVertical      ENUMERATED {n1, n2, n4, n6, n8}
   }
   tpmiPeriodForCodebook   SEQUENCE {
      firstPartPeriod            ENUMERATED {n1, n2, n5, n10, n20, n40}
      SecondPartPeriod           ENUMERATED {n1, n2, n5, n10, n20, n40}
   }
```

If "firstPartPeriod" is set to 1 or this parameter is not configured, the first information is sent by default in each DCI for scheduling the PUSCH. If "SecondPartPeriod" is not configured or the value of this parameter is 1, the second information is sent by default in each DCI for scheduling the PUSCH.

When a value of "firstPartPeriod" is greater than 1, it indicates that the sending period of the first information is n5, n10, n20, n40, or the like, that is, corresponds to 2 ms, 5 ms, 10 ms, 20 ms, 40 ms, or the like. Certainly, another value may also be used. Similarly, when a value of "SecondPartPeriod" is greater than 1, it indicates that the sending period of the second information is n5, n10, n20, n40, or the like. The sending period of the first information is less than or equal to the sending period of the second information.

When the antenna is a dual-polarized antenna, the precoding matrix is associated with the index value indicated by the first information and the index value indicated by the second information. Therefore, when the first information and the second information are sent via the DCI, different bit areas may carry the first information and the second information in the DCI. For example, if the quantity of bits included in the first information indicating the index value $i_1$ is 4, and the quantity of bits included in the second information indicating the index value $i_2$ is 2, the first four bits of the precoding information indication sub-segment in the DCI may indicate the index value $i_1$, and the last two bits may indicate the index value $i_2$. If the index value $i_1$ is not indicated, only two bits are required to indicate the index value $i_2$.

In conclusion, it can be learned that in this embodiment of this application, there are at least two implementations for indicating the precoding matrix. Implementation 1: The precoding matrix is indicated by only the first information. In this case, the first information may be an index value of the precoding matrix.

Implementation 2: The precoding matrix is indicated by the first information and the second information. For example, the first information may indicate the first matrix and the second matrix, and the second information may indicate the phase offset θ.

Further, quantities of bits included in the first information and the second information may be different in different implementations. The following separately describes various possible cases of the quantities of bits included in the first information and the second information. In the following description, a quantity of horizontal-dimension antenna ports is defined as $N_1$, and a quantity of vertical-dimension antenna ports is defined as $N_2$. The horizontal-dimension oversampling factor is defined as $O_1$, the vertical-dimension oversampling factor is defined as $O_2$, and a phase quantization factor is defined as M. When the foregoing implementation 2 is used, the index value indicated by the first information is $i_1$, and the index value indicated by the second information is $i_2$.

Case 1: A quantity of antenna ports of the terminal device is 2, and a maximum rank is 1.

Scenario 1: If the antenna of the terminal device is a dual-polarized antenna, and $N_1=N_2=1$, the precoding matrix W may satisfy the following form:

$$w = \begin{bmatrix} 1 \\ e^{j\theta} \end{bmatrix} \quad (7)$$

In this case, the precoding matrix includes only one variable, that is, a phase offset θ, and one phase offset θ corresponds to one precoding matrix. It should be noted that if $N_1$ is equal to 1, a default value of $O_1$ is 1; and if $N_2$ is equal to 1, a default value of $O_2$ is 1.

In this case, if implementation 1 is used, the precoding matrix is indicated by only the first information, and the first information may be an index value of the precoding matrix or an index value of the phase offset θ in a set {0, 2π/M, ..., 2π(M−1)/M}. A quantity of bits included in the first information may be greater than or equal to $\lceil \log_2(M) \rceil$, where $\lceil \ \rceil$ a round-up function.

If implementation 2 is used, the precoding matrix is indicated by the first information and the second information. In this case, the first matrix and the second matrix may not need to be indicated, and the index value of the phase offset θ in the set {0, 2π/M, ..., 2π(M−1)/M} needs to be indicated by only the second information. A quantity of bits included in the second information may be greater than or equal to $\lceil \log_2(M) \rceil$.

In this case, for example, when the phase quantization factor M=8, a set corresponding to possible values of the phase offset θ is $$\left\{ 0, \frac{\pi}{4}, \frac{\pi}{2}, \frac{3\pi}{4}, \pi, \frac{5\pi}{4}, \frac{3\pi}{2}, \frac{7\pi}{4} \right\}.$$

The first information or the second information may include three bits. Each bit quantized value may indicate a value of the phase offset in the foregoing set. A value of the first information or the second information is any one of 0 to 7.

Scenario 2: If an antenna of the terminal device is a single-polarized antenna, a quantity of antenna ports in a horizontal direction may be 2 or a quantity of antenna ports in a vertical direction may be 2, that is, $N_1=2$ and $N_2=1$, or $N_2=1$ and $N_1=2$. According to the foregoing codebook generation formula (6), a quantity of precoding matrices included in the codebook set is $L=N_1 \cdot O_1 \cdot N_2 \cdot O_2$, each precoding matrix is numbered, and an index value of the precoding matrix ranges from 0 to L−1. If $N_1$ is equal to 1, a default value of $O_1$ is 1; and if $N_2$ is equal to 1, a default value of $O_2$ is 1.

In this case, the phase offset θ does not need to be indicated. In other words, regardless of whether implementation 1 or implementation 2 is used, the precoding matrix may be indicated by the first information, the first information may be an index value of the precoding matrix, and a quantity of bits included in the first information is greater than or equal to $\lceil \log_2(L) \rceil$. If $2^{\lceil \log_2(L) \rceil} > L$, the remaining bit values do not indicate the precoding matrix, and are reserved. It can be learned from formula (6) that an index value of each precoding matrix may correspond to values of t and m in $v_{t,m}$, that is, correspond to an index value of the first matrix and an index value of the second matrix.

With reference to the foregoing description, for example, the correspondence between the first information and the index value of the precoding matrix may be shown in Table 6.

TABLE 6

| Values of bits included in the first information | Index value of the precoding matrix |
|---|---|
| 0 | 0 |
| 1 | 1 |
| 2 | 2 |
| ... | ... |
| L − 1 | L − 1 |
| ... | Reserved |

Case 2: A quantity of antenna ports of the terminal device is 2, and a maximum rank is 2.

Scenario 1: If the antenna of the terminal device is a dual-polarized antenna, the precoding matrix W may satisfy the following form:

$$w = \begin{bmatrix} 1 & 1 \\ e^{j\theta} & -e^{j\theta} \end{bmatrix} \quad (8)$$

In this case, the precoding matrix includes only one variable, that is, a phase offset θ, and one phase offset θ corresponds to one precoding matrix.

In this case, because the maximum rank is 2, a maximum quantity of transmitted layers is 2.

If implementation 1 is used, when the precoding matrix is indicated by only the first information, and the first information is the index value of the precoding matrix, considering rank adaptation, the network device may indicate the terminal device to perform transmission based on a rank of 1 or 2. In this case, each layer corresponds to M precoding matrices, two layers correspond to 2M precoding matrices in total, a value range of the index value of the precoding matrix may be 0 to 2M−1, and a quantity of bits included in the first information is greater than or equal to $\lceil \log_2(2M) \rceil$.

If implementation 2 is used, the precoding matrix is indicated by the first information and the second information. It can be learned from the formula in the foregoing scenario 1 that in this case, the first matrix and the second matrix do not need to be indicated, that is, the first information does not need to be sent. The index value $i_2$ of the phase offset θ needs to be indicated by only the second information. Considering rank adaptation, a maximum quantity of transmitted layers is 2. In this case, a value range of an index value $i_2$ indicated by the second information may be 0 to 2M−1. A quantity of bits included in the second information is greater than or equal to $\lceil \log_2(2M) \rceil$.

An example may be shown in Table 7. When the first information indicates the index value of the precoding matrix, precoding matrices in different ranks are indicated. When the maximum rank is set to 2, the rank of the terminal device may be 1 or 2. Therefore, a specific rank value needs to be indicated, and a precoding matrix corresponding to the rank also needs to be indicated. For example, when the rank is 1, the rank corresponds to one layer in the table, and a precoding matrix index may be 0 to M−1. When the rank is 2, the rank corresponds to two layers in the table, and a precoding matrix index may be 0 to M−1. It should be noted that precoding matrix sets corresponding to cases that the rank is 1 and the rank is 2 are different, and the foregoing indexes correspond to precoding matrices in respective codebook sets.

TABLE 7

| Values of bits included in the first information | Index value of the precoding matrix |
|---|---|
| 0 | 1 layer: 0 |
| 1 | 1 layer: 1 |
| 2 | 1 layer: 2 |
| ... | ... |
| M − 1 | 1 layer: M − 1 |
| M | 2 layers: 0 |
| ... | ... |
| 2*M − 1 | 2 layers: M − 1 |
| ... | Reserved |

Scenario 2: If a single-polarized antenna is used, $N_1=2$ and $N_2=1$, or $N_2=1$ and $N_1=2$.

When a single-polarized antenna is used, the second information does not need to be sent, and only the first information needs to be sent.

If only one layer of precoding matrix is indicated, the precoding matrix is indicated by the first information, and when the first information is an index value of the precoding matrix, a quantity of bits included in the first information may be greater than or equal to $\lceil \log_2(L) \rceil$, where $L = N_1 \cdot O_1 \cdot N_2 \cdot O_2$.

Considering rank adaptation, the network device may indicate index values of precoding matrices in different ranks by using the first information, and a value range of the index values of the precoding matrices in the different ranks may be 0 to K1. K1 may be greater than or equal to 1 and less than or equal to $N_1 N_2 * \max(N_1-1,1) * \max(N_2-1,1) * O_1 O_2$. Correspondingly, in this case, the quantity of bits included in the first information may be greater than or equal to $\lceil \log_2(N_1 N_2 * \max(N_1-1,1) * \max(N_2-1,1) * O_1 O_2) \rceil$, where max( ) is an operation for obtaining the maximum value.

When the terminal device performs transmission based on a rank of 2, a precoding matrix of the first layer is the same as a precoding matrix used when transmission is performed based on a rank of 1. During second-layer transmission, a precoding matrix orthogonal to the precoding matrix of the first layer needs to be selected from the codebook set.

It is assumed that the precoding matrix of the first layer is $v_{t,m}$, and when $N_1=2$ and $N_2=1$, the precoding matrix of the second layer is $v_{t'+t_m}$, where an index set of t' is {0, $O_1$, $2O_1$, ..., $(N_1-1) \cdot O_1$}. For example, when t=0, another value other than 0 may be selected for t'. When t=$O_1$, another value other than 0 may be selected for t'.

When $N_2=1$ and $N_1=2$, the precoding matrix of the second layer is $v_{t,m+m'}$, where an index set of m' is {0, $O_2$, $2O_2$, . . . , $(N_2-1)\cdot O_2$}. For example, when m=0, another value other than 0 may be selected for m'. When $m=O_2$, another value other than 0 may be selected for m'.

In conclusion, it can be learned that a maximum value of the quantity of precoding matrices included in the codebook set is $N_1{}^2N_2{}^2O_1O_2$. In this case, when the first information is the index of the precoding matrix, the quantity of bits included in the first information is greater than or equal to $\lceil \log_2(N_1{}^2N_2{}^2O_1O_2) \rceil$.

Case 3: A quantity of antenna ports of the terminal device is 4, and a maximum rank is 1.

As shown in Table 8, a set of values of $N_1$ and $N_2$ under a dual-polarized antenna and a single-polarized antenna is listed. If the antenna is a dual-polarized antenna, there are two groups of possible values of $N_1$ and $N_2$. If the antenna is a single-polarized antenna, there are 3 groups of possible values of $N_1$ and $N_2$.

TABLE 8

Value sets of $N_1$ and $N_2$ when there are 4 antenna ports

| Polarization Type | Quantity of antenna ports | ($N_1$, $N_2$) |
|---|---|---|
| Dual-polarized antenna | 4 | (1, 2) |
| Dual-polarized antenna | 4 | (2, 1) |
| Single-polarized antenna | 4 | (1, 4) |
| Single-polarized antenna | 4 | (4, 1) |
| Single-polarized antenna | 4 | (2, 2) |

According to the foregoing codebook generation formula, a quantity of precoding matrices included in a codebook set in a same polarization direction is $L=N_1 \cdot O_1 \cdot N_2 \cdot O_2$.

Scenario 1: The antenna is a single-polarized antenna, the second information does not need to be sent, and only the first information needs to be sent. When the first information is an index value of the precoding matrix, a quantity of bits included in the first information is greater than or equal to $\lceil \log_2(L) \rceil$. An index range of the precoding matrix is 0 to L−1.

Scenario 2: The antenna is a dual-polarized antenna, and the phase offset θ needs to be further considered.

If implementation 1 is used, the precoding matrix is indicated by only the first information, the first information may be an index value of the precoding matrix, a maximum value of a quantity of precoding matrices included in the codebook set is LM, and an index range of the precoding matrix is 0 to LM−1. In this case, the quantity of bits included in the first information may be greater than or equal to $\lceil \log_2(LM) \rceil$.

If implementation 2 is used, the precoding matrix is indicated by the first information and the second information, a quantity of $v_{t,m}$ formed by the first matrix and the second matrix is L, and a quantity of bits included in the first information is greater than or equal to $\lceil \log_2(L) \rceil$. When the phase offset θ is indicated by the second information, a quantity of bits included in the second information is greater than or equal to $\lceil \log_2(M) \rceil$.

Case 4: A quantity of antenna ports of the terminal device is 4, and a maximum rank is 2.

When the rank is 2 and the antenna is a dual-polarized antenna, the precoding matrix W satisfies the following form:

$$w = \begin{bmatrix} v_{t,m} & v_{t+t',m+m'} \\ v_{t,m} \cdot e^{j\theta} & v_{t+t',m+m'} \cdot e^{j\theta} \end{bmatrix} \quad (9)$$

where m=0, 1, 2, . . . , $N_2O_2-1$, and t=0, 1, 2, . . . , $N_1O_1-1$.

When $(N_1, N_2)=(1, 2)$, t'=0, m'∈ {0, $O_2$, . . . , $(N_2-1)O_2$}.
When $(N_1, N_2)=(2, 1)$, m'=0, t'∈ {0, $O_1$, . . . , $(N_1-1)O_1$}.

If implementation 1 is used, the precoding matrix is indicated by only the first information, the first information may be an index value of the precoding matrix, and a quantity of precoding matrices included in a codebook set in a same polarization direction is $L=N_1 \cdot O_1 \cdot N_2 \cdot O_2$. Then, considering a phase offset θ and rank adaptation, the quantity of precoding matrices included in the codebook set is $LMN_1N_2$, and an index range of the precoding matrices is 0 to $LMN_1N_2-1$. A quantity of bits included in the first information is greater than or equal to $\lceil \log_2(LMN_1N_2) \rceil$.

If implementation 2 is used, the precoding matrix is indicated by the first information and the second information, a quantity of bits included in the first information is greater than or equal to $\lceil \log_2(LN_1N_2) \rceil$, and the second information indicates an index value $i_2$ of the phase offset θ, and includes bits whose quantity is greater than or equal to $\lceil \log_2(M) \rceil$.

When the rank is 2 and the antenna is a single-polarized antenna, the precoding matrix W satisfies the following form:

$$w = [v_{t,m} v_{t+t',m+m'}] \quad (10)$$

where m=0, 1, 2, . . . , $N_2O_2-1$, and t=0, 1, 2, . . . , $N_1O_1-1$.

When $(N_1, N_2)=(1, 4)$, t'=0, m'∈ {0, $O_2$, . . . , $(N_2-1)O_2$}.
When $(N_1, N_2)=(4, 1)$, m'=0, t'∈ {0, $O_2$, . . . , $(N_1-1)O_1$}.
When $(N_1, N_2)=(2, 2)$, t'∈ {0, $O_2$, . . . , $(N_1-1)O_1$}, and m'∈ {0, $O_2$, . . . , $(N_2-1)O_2$}.

When the quantity of precoding matrices included in the codebook set in the same polarization direction is $L=N_1 \cdot O_1 \cdot N_2 \cdot O_2$, and the first information is the index of the precoding matrix, the quantity of bits included in the first information is greater than or equal to $\lceil \log_2(LN_1N_2) \rceil$, and both the index of the precoding matrix when the rank is 1 and the index of the precoding matrix when the rank is 2 may be indicated. In this case, the second information does not need to be sent.

Case 5: A quantity of antenna ports of the terminal device is 4, and a maximum rank is 3.

When the rank is 3 and the antenna is a dual-polarized antenna, the precoding matrix W satisfies the following form:

$$w = \begin{bmatrix} v_{t,m} & v_{t+t',m+m'} & v_{t,m} \\ v_{t,m} \cdot e^{j\theta} & v_{t+t',m+m'} \cdot e^{j\theta} & -v_{t,m} \cdot e^{j\theta} \end{bmatrix} \quad (11)$$

Values of t, m, t', and m' are the same as those in the scenario in which the rank is 2 in the foregoing case 4. Because the third-layer precoding matrix needs to be indicated, a quantity of precoding matrices included in the codebook set increases.

If implementation 1 is used, the precoding matrix is indicated by only the first information, the first information may be an index value of the precoding matrix, and a quantity of precoding matrices included in a codebook set in a same polarization direction is $L=N_1 \cdot O_1 \cdot N_2 \cdot O_2$. Then, considering a phase offset θ and rank adaptation, the quantity of precoding matrices included in the codebook set is $2LMN_1N_2$, a quantity of bits included in the first information is greater than or equal to $\lceil \log_2(2LMN_1N_2) \rceil$, and an index range of the precoding matrices is 0 to $2LMN_1N_2-1$. In this case the first information may indicate the index value of the precoding matrix when the rank is 1, the index value of the precoding matrix when the rank is 2, and the index value of the precoding matrix when the rank is 3.

If implementation 2 is used, the precoding matrix is indicated by the first information and the second information, a quantity of bits included in the first information is greater than or equal to $\lceil \log_2(2LN_1N_2) \rceil$, and the second information indicates an index value $i_2$ of the phase offset θ, and includes bits whose quantity is greater than or equal to $\lceil \log_2(M) \rceil$.

When the rank is 3 and the antenna is a single-polarized antenna, the precoding matrix W satisfies the following form:

$$W=[v_{t,m} v_{t+t',m=m''} v_{t+t',m+m''}] \quad (12)$$

Value sets of t" and m" are respectively the same as value sets of t' and m'. However, the selected third-layer precoding matrix needs to be orthogonal to the first-layer precoding matrix and the second-layer precoding matrix, so as to implement orthogonal three-stream transmission. In this case, when the first information is an index of the precoding matrix, a quantity of bits included in the first information is greater than or equal to $\lceil \log_2(2LN_1N_2) \rceil$. In this case, the second information does not need to be sent.

Case 6: A quantity of antenna ports of the terminal device is 4, and a maximum rank is 4.

When the rank is 4 and the antenna is a dual-polarized antenna, the precoding matrix W satisfies the following form:

$$W = \begin{bmatrix} v_{t,m} & v_{t+t',m+m'} & v_{t,m} & v_{t+t',m+m'} \\ v_{t,m} \cdot e^{j\theta} & v_{t+t',m+m'} e^{j\theta} & -v_{t,m} \cdot e^{j\theta} & -v_{t+t',m+m'} e^{j\theta} \end{bmatrix} \quad (13)$$

Values of t, m, t', and m' are the same as those in the scenario in which the rank is 2 in the case 4. Because the fourth-layer precoding matrix needs to be indicated, a quantity of precoding matrices included in the codebook set increases.

If implementation 1 is used, the precoding matrix is indicated by only the first information, the first information may be an index value of the precoding matrix, and a quantity of precoding matrices included in a codebook set in a same polarization direction is $L=N_1 \cdot O_1 \cdot N_2 \cdot O_2$. Then, considering a phase offset θ and rank adaptation, the quantity of precoding matrices included in the codebook set is $3LMN_1N_2$, and an index range of the precoding matrices is 0 to $3LMN_1N_2-1$. A quantity of bits included in the first information is greater than or equal to $\lceil \log_2(3LMN_1N_2) \rceil$.

If implementation 2 is used, the precoding matrix is indicated by the first information and the second information. If precoding matrices in different ranks further need to be indicated, a quantity of bits included in the first information is greater than or equal to $\lceil \log_2(3LN_1N_2) \rceil$, and the second information indicates an index value $i_2$ of the phase offset θ, and includes bits whose quantity is greater than or equal to $\lceil \log_2(M) \rceil$.

When the rank is 4 and the antenna is a single-polarized antenna, the precoding matrix W satisfies the following form:

$$W=[v_{t,m} v_{t+t',m+m'} v_{t+t'',m+m''} v_{t+t''',m+m'''}] \quad (14)$$

Value sets of t" and m" are respectively the same as value sets of t' and m'. However, the selected fourth-layer precoding matrix needs to be orthogonal to the first-layer precoding matrix, the second-layer precoding matrix, and the third-layer precoding matrix, so as to implement orthogonal four-stream transmission. In this case, the quantity of bits included in the first information is greater than or equal to $\lceil \log_2(3LN_1N_2) \rceil$. In this case, the second information does not need to be sent.

Case 7: A quantity of antenna ports of the terminal device is 8, and a maximum rank is 1.

As shown in Table 9, a set of values of $N_1$ and $N_2$ under a dual-polarized antenna and a single-polarized antenna is listed. If the antenna is a dual-polarized antenna, there are three groups of possible values of $N_1$ and $N_2$. If the antenna is a single-polarized antenna, there are 4 groups of possible values of $N_1$ and $N_2$.

TABLE 9

Value sets of $N_1$ and $N_2$ when there are 8 antenna ports

| Polarization Type | Quantity of antenna ports | ($N_1$, $N_2$) |
| --- | --- | --- |
| Dual-polarized antenna | 8 | (1, 4) |
| Dual-polarized antenna | 8 | (4, 1) |
| Dual-polarized antenna | 8 | (2, 2) |
| Single-polarized antenna | 8 | (1, 8) |
| Single-polarized antenna | 8 | (8, 1) |
| Single-polarized antenna | 8 | (2, 4) |
| Single-polarized antenna | 8 | (4, 2) |

According to the codebook generation formula, a quantity of precoding matrices included in a codebook set in a same polarization direction is $L=N_1 \cdot O_1 \cdot N_2 \cdot O_2$.

Scenario 1: The antenna is a single-polarized antenna, the second information does not need to be sent, and only the first information needs to be sent. When the first information is an index value of the precoding matrix, a quantity of bits included in the first information is greater than or equal to $\lceil \log_2(L) \rceil$. An index range of the precoding matrix is 0 to L−1.

If implementation 1 is used, the precoding matrix is indicated by only the first information, the first information may be an index value of the precoding matrix, a quantity of precoding matrices included in the codebook set is LM, a quantity of bits included in the first information is greater than or equal to $\lceil \log_2(LM) \rceil$, and an index range of the precoding matrix is 0 to LM−1.

If implementation 2 is used, the precoding matrix is indicated by the first information and the second information, a quantity of $v_{t,m}$ formed by the first matrix and the second matrix is L, and a quantity of bits included in the first information is greater than or equal to $\lceil \log_2(L) \rceil$. When the phase offset θ is indicated by the second information, a quantity of bits included in the second information is greater than or equal to $\lceil \log_2(M) \rceil$.

Case 8: A quantity of antenna ports of the terminal device is 8, and a maximum rank is 2.

In this case, for a quantity of bits included in the first information, refer to Case 4, but values of $N_1$ and $N_2$ may be different.

Case 9: A quantity of antenna ports of the terminal device is 8, and a maximum rank is 3.

In this case, for a quantity of bits included in the first information, refer to Case 5, but values of $N_1$ and $N_2$ may be different.

Case 10: A quantity of antenna ports of the terminal device is 8, and a maximum rank is 4.

In this case, for a quantity of bits included in the first information, refer to Case 6, but values of $N_1$ and $N_2$ may be different.

When the quantity of antenna ports is 8 and the rank is another value, for a method for determining the precoding matrix, refer to the foregoing descriptions. It should be noted that a precoding matrix at any layer needs to be orthogonal to a precoding matrix at another layer.

With reference to the foregoing descriptions, in step 305, the terminal device may determine the first matrix and the second matrix based on the first information, to determine the precoding matrix based on the first matrix and the second matrix.

When the first information includes the first part and the second part, the terminal device may determine the first matrix based on the first part, and determine the second matrix based on the second part.

When the first information indicates an index value obtained by jointly encoding the first matrix and the second matrix, for example, the first information is an index value of a matrix $v_{t,m}$ determined based on the first matrix and the second matrix, the terminal device may determine, based on the index value of the matrix $v_{t,m}$, the first matrix and the second matrix that constitute the matrix $v_{t,m}$, to determine the precoding matrix.

Further, when the antenna is a dual-polarized antenna, the terminal device may further determine the phase offset θ based on the second information, to determine the precoding matrix based on the phase offset θ, the first matrix, and the second matrix with reference to formula (5).

When the first information indicates the index value of the precoding matrix, the terminal device may determine the precoding matrix directly based on the index value of the precoding matrix.

The terminal device may send the uplink signal to the network device by using the precoding matrix. A specific sending manner is not limited in this embodiment of this application, and details are not described herein again.

Embodiments described in this specification may be independent solutions, or may be combined based on internal logic. All these solutions fall within the protection scope of this application.

It may be understood that, in the foregoing method embodiments, the methods and the operations implemented by the terminal device may alternatively be implemented by a component (for example, a chip or a circuit) used in the terminal device, and the methods and the operations implemented by the network device may alternatively be implemented by a component (for example, a chip or a circuit) used in the network device.

In the foregoing embodiments provided in this application, the methods provided in embodiments of this application are separately described from a perspective of interaction between devices. To implement functions in the foregoing methods provided in embodiments of this application, the terminal device and the network device may include a hardware structure and/or a software module, and implement the foregoing functions in a form of the hardware structure, the software module, or a combination of the hardware structure and the software module. Whether a specific function in the foregoing functions is performed by using the hardware structure, the software module, or the combination of the hardware structure and the software module depends on a specific application and a design constraint of the technical solutions.

In this embodiment of this application, module division is an example, and is merely a logical function division. In actual implementation, another division manner may be used. In addition, functional modules in embodiments of this application may be integrated into one processor, or may exist alone physically, or two or more modules may be integrated into one module. The integrated module may be implemented in a form of hardware, or may be implemented in a form of a software functional module.

Figure 4:
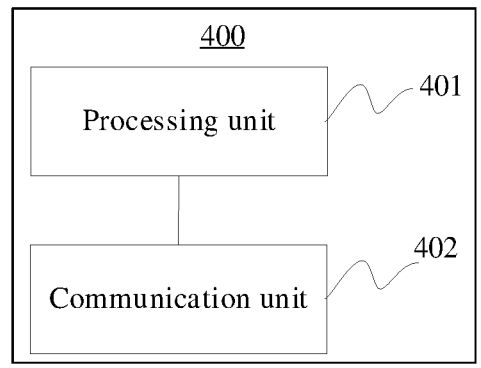
FIG. 4 is a schematic diagram of a structure of a communication apparatus according to an embodiment of this application.

Same as the foregoing concept, as shown in FIG. 4, an embodiment of this application further provides an apparatus 400 configured to implement a function of the terminal device or the network device in the foregoing method. For example, the apparatus may be a software module or a chip system. In this embodiment of this application, the chip system may include a chip, or may include the chip and another discrete component. The apparatus 400 may include a processing unit 401 and a communication unit 402.

In this embodiment of this application, the communication unit may also be referred to as a transceiver unit, and may include a sending unit and/or a receiving unit, which are respectively configured to perform sending and receiving steps of the terminal device or the network device in the foregoing method embodiments.

Figure 5:
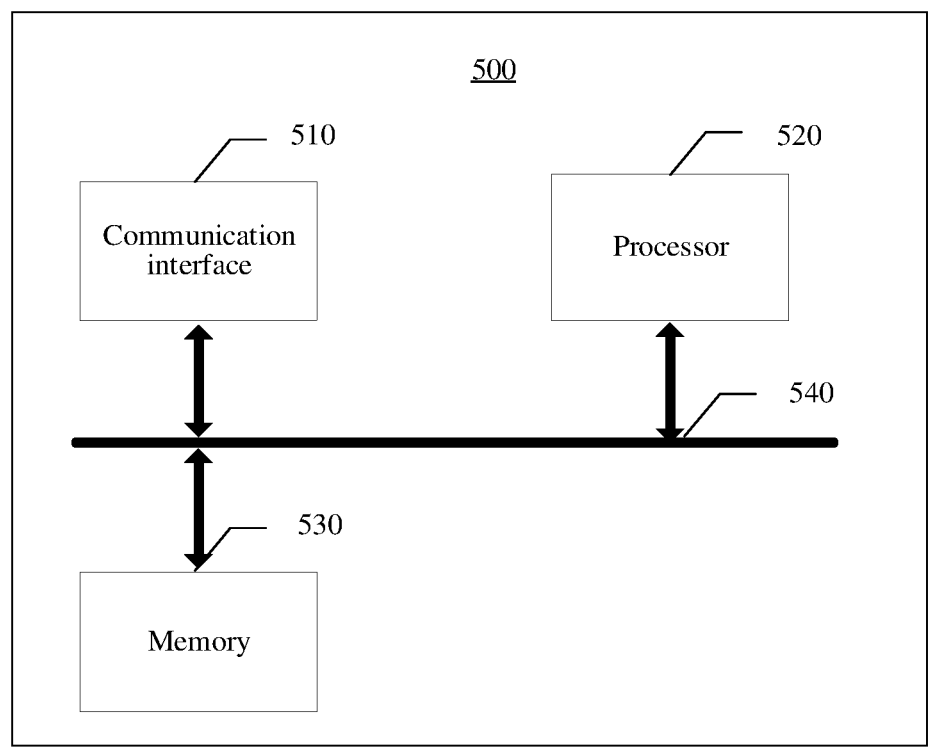
FIG. 5 is a schematic diagram of a structure of a communication apparatus according to an embodiment of this application.

The following describes in detail a communication apparatus in embodiments of this application with reference to FIG. 4 and FIG. 5. It should be understood that descriptions of the apparatus embodiments correspond to the descriptions of the method embodiments. Therefore, for content that is not described in detail, refer to the foregoing method embodiments. For brevity, details are not described herein again.

In a possible design, the apparatus 400 may implement steps or procedures corresponding to the terminal device or the network device in the foregoing method embodiments. Descriptions are separately provided below.

For example, when the apparatus 400 implements functions of the terminal device in the procedure shown in FIG. 3:

the communication unit 402 is configured to receive first information from a network device, where the first information indicates a precoding matrix; and the processing unit 401 is configured to determine the precoding matrix based on the first information, where the precoding matrix is for sending an uplink signal, where the precoding matrix is determined based on a first matrix and a second matrix; and the first matrix is determined from a first matrix set based on the first information, where the first matrix set is determined based on a horizontal-dimension parameter of an antenna of the terminal device; and/or the second matrix is determined from a second matrix set based on the first information, where the second matrix set is determined based on a vertical-dimension parameter of the antenna.

In a possible design, the communication unit is further configured to:

receive second information from the network device, where the second information indicates a phase offset between antennas in different polarization directions of the terminal device.

The processing unit is further configured to:

determine the precoding matrix based on the first information and the second information.

In a possible design, the precoding matrix W satisfies the following form:

$$w = \begin{bmatrix} v_{t,m} \\ v_{t,m} \cdot e^{j\theta} \end{bmatrix}$$

where $v_{t,m}$ is determined based on the first matrix and the second matrix, and $\theta$ is the phase offset.

In a possible design, the precoding matrix W satisfies the following form:

$$W = v_{t,m}$$

where $v_{t,m}$ is determined based on the first matrix and second matrix.

In a possible design, $v_{t,m}$ satisfies the following form:

$$v_{t,m} \begin{bmatrix} u_m e^{j\frac{2\pi t}{O_1 N_1}} & \ldots & u_m e^{j\frac{2\pi t(N_1-1)}{O_1 N_1}} \end{bmatrix}$$

where $$u_m = \begin{bmatrix} 1 & e^{j\frac{2\pi m}{N_2 \cdot O_2}} & \ldots & e^{j\frac{2\pi m(N_2-1)}{N_2 \cdot O_2}} \end{bmatrix},$$

$N_1$ is a quantity of horizontal-dimension antenna ports, $O_1$ is a horizontal-dimension oversampling factor, $N_2$ is a quantity of vertical-dimension antenna ports, j is an imaginary number, $O_2$ is a vertical-dimension oversampling factor, m=0, 1, 2, . . . , $N_2 O_2-1$, and t=0, 1, 2, . . . , $N_2 O_2-1$.

In a possible design, the horizontal-dimension parameter of the antenna includes the quantity of horizontal-dimension antenna ports.

The vertical-dimension parameter of the antenna includes the quantity of vertical-dimension antenna ports.

In a possible design, the first information indicates an index value of the first matrix and an index value of the second matrix; or the first information indicates an index value of the precoding matrix.

For example, when the apparatus 400 implements functions of the network device in the procedure shown in FIG. 3:

the communication unit 402 is configured to receive antenna configuration information from a terminal device, where the antenna configuration information includes an antenna parameter for determining a precoding matrix; and measure a reference signal from the terminal device, to obtain a channel measurement result; and the processing unit 401 is configured to determine the precoding matrix based on the channel measurement result and the antenna configuration information.

The communication unit 402 is configured to send first information to the terminal device. The first information indicates the precoding matrix. The precoding matrix is determined based on a first matrix and a second matrix. The first matrix is determined from a first matrix set based on the channel measurement result, where the first matrix set is determined based on a horizontal-dimension parameter of an antenna of the terminal device. The second matrix is determined from a second matrix set based on the channel measurement result, where the second matrix set is determined based on a vertical-dimension parameter of the antenna.

In a possible design, the communication unit is further configured to:

send second information to the terminal device, where the second information indicates a phase offset between antennas in different polarization directions of the terminal device.

In a possible design, the precoding matrix W satisfies the following form:

$$w = \begin{bmatrix} v_{t,m} \\ v_{t,m} \cdot e^{j\theta} \end{bmatrix}$$

where $v_{t,m}$ is determined based on the first matrix and the second matrix, and $\theta$ is the phase offset.

In a possible design, the precoding matrix W satisfies the following form:

$$W = v_{t,m}$$

where $v_{t,m}$ is determined based on the first matrix and the second matrix.

In a possible design, $v_{t,m}$ satisfies the following form:

$$v_{t,m} \begin{bmatrix} u_m e^{j\frac{2\pi t}{O_1 N_1}} & \ldots & u_m e^{j\frac{2\pi t(N_1-1)}{O_1 N_1}} \end{bmatrix}$$

where $$u_m = \begin{bmatrix} 1 & e^{j\frac{2\pi m}{N_2 \cdot O_2}} & \ldots & e^{j\frac{2\pi m(N_2-1)}{N_2 \cdot O_2}} \end{bmatrix},$$

$N_1$ is a quantity of horizontal-dimension antenna ports, $O_1$ is a horizontal-dimension oversampling factor, $N_2$ is a quantity of vertical-dimension antenna ports, j is an imaginary number, $O_2$ is a vertical-dimension oversampling factor, m=0, 1, 2, . . . , $N_2 O_2-1$, and t=0, 1, 2, . . . , $N_2 O_2-1$.

In a possible design, the horizontal-dimension parameter of the antenna includes the quantity of horizontal-dimension antenna ports.

The vertical-dimension parameter of the antenna includes the quantity of vertical-dimension antenna ports.

In a possible design, the first information indicates an index value of the first matrix and an index value of the second matrix; or the first information indicates an index value of the precoding matrix.

FIG. 5 shows an apparatus 500 according to an embodiment of this application. The apparatus shown in FIG. 5 may be an implementation of a hardware circuit of the apparatus shown in FIG. 4. The communication apparatus is applicable to the flowchart shown in FIG. 3, and implements functions of the terminal device or the network device in the foregoing method embodiments. For ease of description, FIG. 5 shows only main components of the communication apparatus.

The apparatus 500 shown in FIG. 5 includes at least one processor 520, configured to implement any method in FIG. 3 provided in embodiments of this application.

The apparatus 500 may further include at least one memory 530, configured to store program instructions and/or data. The memory 530 is coupled to the processor 520. The coupling in this embodiment of this application is indirect coupling or a communication connection between apparatuses, units, or modules for information exchange between the apparatuses, the units, or the modules, and may be in electrical, mechanical, or other forms. The processor 520 may operate in collaboration with the memory 530. The processor 520 may execute the program instructions stored in the memory 530. At least one of the at least one memory may be included in the processor.

In an implementation process, the steps in the foregoing methods can be implemented by using a hardware integrated logic circuit in the processor, or by using instructions in a form of software. The steps of the methods disclosed with reference to embodiments of this application may be performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that the processor in embodiments of this application may be an integrated circuit chip, and has a signal processing capability. In an implementation process, steps in the foregoing method embodiments are implemented by using a hardware integrated logic circuit in the processor, or by using instructions in a form of software. The foregoing processor may be a general-purpose processor, a digital signal processing circuit (DSP), an application-specific integrated circuit (ASIC), a field programmable gate array (FPGA), another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps of the methods disclosed with reference to embodiments of this application may be performed by a hardware decoding processor, or may be performed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in embodiments of this application may be a volatile memory or a non-volatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. By way of example and not limitation, RAMs in many forms may be used, for example, a static random access memory (SRAM), a dynamic random access memory (DRAM), a synchronous dynamic random access memory (SDRAM), a double data rate synchronous dynamic random access memory (, DDR SDRAM), an enhanced synchronous dynamic random access memory (ESDRAM), a synchlink dynamic random access memory (SLDRAM), and a direct rambus random access memory (DR RAM). It should be noted that the memory in the systems and methods described in this specification includes but is not limited to these and any memory of another appropriate type.

The apparatus 500 may further include a communication interface 510, configured to communicate with another device through a transmission medium, so that an apparatus in the apparatus 500 can communicate with another device. In this embodiment of this application, the communication interface may be a transceiver, a circuit, a bus, a module, or a communication interface of another type. In this embodiment of this application, when the communication interface is the transceiver, the transceiver may include an independent receiver and an independent transmitter, or may be a transceiver integrated with a transceiver function, or may be an interface circuit.

The apparatus 500 may further include a communication line 540. The communication interface 510, the processor 520, and the memory 530 may be connected to each other through the communication line 540. The communication line 540 may be a peripheral component interconnect (PCI for short) bus, an extended industry standard architecture (EISA for short) bus, or the like. The communication line 540 may be classified into an address bus, a data bus, a control bus, and the like. For ease of representation, only one bold line represents the bus in FIG. 5, but this does not mean that there is only one bus or only one type of bus.

It should be understood that the processor 520 is configured to execute the instruction or the program stored in the memory 530. When the instruction or program stored in the memory 530 is executed, the processor 520 is configured to perform an operation performed by the processing unit 401 in the foregoing embodiment, and the communication interface 510 is configured to perform an operation performed by the communication unit 402 in the foregoing embodiment. For details, refer to the foregoing descriptions. Details are not described herein again.

An embodiment of this application further provides a computer-readable storage medium. The computer-readable storage medium stores a computer program. When the program is executed by a processor, a procedure related to the terminal device in the embodiment shown in FIG. 3 provided in the foregoing method embodiments may be implemented.

An embodiment of this application further provides a computer-readable storage medium. The computer-readable storage medium stores a computer program. When the program is executed by a processor, a procedure related to the network device in the embodiment shown in FIG. 3 provided in the foregoing method embodiments may be implemented.

An embodiment of this application further provides a computer program product including instructions. When the instructions are executed, the method performed by the terminal device in the method embodiment shown in FIG. 3 is performed.

An embodiment of this application further provides a computer program product including instructions. When the instructions are executed, the method performed by the network device in the method embodiment shown in FIG. 3 is performed.

An embodiment of this application further provides a chip, including a processor. The processor is coupled to a memory, and is configured to execute a computer program or instructions stored in the memory. When executing the computer program or the instructions, the processor performs the method performed by the terminal device in the method embodiment shown in FIG. 3.

An embodiment of this application further provides a chip, including a processor. The processor is coupled to a memory, and is configured to execute a computer program or instructions stored in the memory. When executing the computer program or the instructions, the processor performs the method performed by the network device in the method embodiment shown in FIG. 3.

It should be further understood that the first, the second, and various numbers in this specification are merely used for differentiation for ease of description, and are not construed as a limitation on the scope of this application.

A person skilled in the art should understand that embodiments of this application may be provided as a method, a system, or a computer program product. Therefore, this application may use a form of a hardware-only embodiment, a software-only embodiment, or an embodiment with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device, and the computer program product according to this application. It should be understood that computer program instructions may be for implementing each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A communication method, comprising:
   receiving, by a terminal device, first information from a network device, wherein the first information indicates a precoding matrix; and
   determining, by the terminal device, the precoding matrix based on the first information, wherein the precoding matrix is for sending an uplink signal, wherein
   the precoding matrix is further determined based on a first matrix and a second matrix; and
   at least one of:
      the first matrix is determined from a first matrix set based on the first information, wherein the first matrix set is determined based on a horizontal-dimension parameter of an antenna of the terminal device; or
      the second matrix is determined from a second matrix set based on the first information, wherein the second matrix set is determined based on a vertical-dimension parameter of the antenna.

2. The communication method according to claim 1, further comprising:
   receiving, by the terminal device, second information from the network device, wherein the second information indicates a phase offset between antennas in different polarization directions of the terminal device; and
   the determining, by the terminal device, the precoding matrix based on the first information comprises:
      determining, by the terminal device, the precoding matrix based on the first information and the second information.

3. The communication method according to claim 2, wherein the precoding matrix is a precoding matrix W that satisfies the following form:

$$W = \begin{bmatrix} v_{t,m} \\ v_{t,m} \cdot e^{j\theta} \end{bmatrix}$$

wherein $v_{t,m}$ is determined based on the first matrix and the second matrix, and $\theta$ is the phase offset.

4. The communication method according to claim 3, wherein the second information indicates an index value of the phase offset $\theta$ in a set $\{0, 2\pi/M, \ldots, 2\pi(M-1)/M\}$, wherein
   a phase quantization factor M is configured by the network device or preset.

5. The communication method according to claim 1, wherein the precoding matrix is a precoding matrix W that satisfies the following form:

$$W = v_{t,m}$$

wherein $v_{t,m}$ is determined based on the first matrix and the second matrix.

6. The method according to claim 3, wherein $v_{t,m}$ satisfies the following form:

$$v_{t,m} \begin{bmatrix} u_m e^{j\frac{2\pi t}{O_1 N_1}} & \ldots & u_m e^{j\frac{2\pi t(N_1-1)}{O_1 N_1}} \end{bmatrix}$$

wherein $$u_m = \begin{bmatrix} 1 & e^{j\frac{2\pi m}{N_2 \cdot O_2}} & \ldots & e^{j\frac{2\pi m(N_2-1)}{N_2 \cdot O_2}} \end{bmatrix},$$

$N_1$ is a quantity of horizontal-dimension antenna ports, $O_1$ is a horizontal-dimension oversampling factor, $N_2$ is a quantity of vertical-dimension antenna ports, j is an imaginary number, $O_2$ is a vertical-dimension oversampling factor, m=0, 1, 2, ... $N_2O_2-1$, and t=0, 1, 2, ..., $N_2O_2-1$.

7. The communication method according to claim 2, wherein
the first information is transmitted via first signaling, and the second information is transmitted via second signaling; and
the first information is valid in a first time unit, and the second information is valid in a second time unit, wherein the first time unit is greater than or equal to the second time unit.

8. The communication method according to claim 1, further comprising:
sending, by the terminal device, antenna configuration information to the network device, wherein the antenna configuration information comprises a polarization type of the antenna of the terminal device, the horizontal-dimension parameter of the antenna, and the vertical-dimension parameter of the antenna.

9. The communication method according to claim 1, wherein the first information indicates an index value of the first matrix and an index value of the second matrix; or the first information indicates an index value of the precoding matrix.

10. A chip, comprising a processor, wherein the processor is coupled to a memory, and is configured to execute a computer program or instructions stored in the memory; and when the processor executes the computer program or the instructions, the method according to claim 1 is performed.

11. A communication method, comprising:
receiving, by a network device, antenna configuration information from a terminal device, wherein the antenna configuration information comprises an antenna parameter for determining a precoding matrix;
measuring, by the network device, a reference signal from the terminal device, to obtain a channel measurement result; and
determining, by the network device, the precoding matrix based on the channel measurement result and the antenna configuration information, and sending first information to the terminal device, wherein the first information indicates the precoding matrix, wherein
the precoding matrix is further determined based on a first matrix and a second matrix; and
at least one of:
the first matrix is determined from a first matrix set based on the channel measurement result, wherein the first matrix set is determined based on a horizontal-dimension parameter of an antenna of the terminal device; or
the second matrix is determined from a second matrix set based on the channel measurement result, wherein the second matrix set is determined based on a vertical-dimension parameter of the antenna.

12. The communication method according to claim 11, further comprising:
sending, by the network device, second information to the terminal device, wherein the second information indicates a phase offset between antennas in different polarization directions of the terminal device.

13. The communication method according to claim 12, wherein the precoding matrix is a precoding matrix W that satisfies the following form:

$$w = \begin{bmatrix} v_{t,m} \\ v_{t,m} \cdot e^{j\theta} \end{bmatrix}$$

wherein $v_{t,m}$ is determined based on the first matrix and the second matrix, and $\theta$ is the phase offset.

14. The communication method according to claim 12, wherein the second information indicates an index value of the phase offset $\theta$ in a set $\{0, 2\pi/M, \ldots, 2\pi(M-1)/M\}$, wherein
a phase quantization factor M is configured by the network device or preset.

15. The communication method according to claim 11, wherein the precoding matrix is a precoding matrix W that satisfies the following form:

$$W = v_{t,m}$$

wherein $v_{t,m}$ is determined based on the first matrix and the second matrix.

16. The method according to claim 13, wherein $v_{t,m}$ satisfies the following form:

$$v_{t,m} \begin{bmatrix} u_m e^{j\frac{2\pi t}{O_1 N_1}} & \ldots & u_m e^{j\frac{2\pi t(N_1-1)}{O_1 N_1}} \end{bmatrix}$$

wherein $$u_m = \begin{bmatrix} 1 & e^{j\frac{2\pi m}{N_2 \cdot O_2}} & \ldots & e^{j\frac{2\pi m(N_2-1)}{N_2 \cdot O_2}} \end{bmatrix},$$

$N_1$ is a quantity of horizontal-dimension antenna ports, $O_1$ is a horizontal-dimension oversampling factor, $N_2$ is a quantity of vertical-dimension antenna ports, j is an imaginary number, $O_2$ is a vertical-dimension oversampling factor, m=0, 1, 2, ... $N_2O_2-1$, and t=0, 1, 2, ..., $N_2O_2-1$.

17. The communication method according to claim 11, further comprising:
receiving, by the network device, antenna configuration information from the terminal device, wherein the antenna configuration information comprises a polarization type of the antenna of the terminal device, the horizontal-dimension parameter of the antenna, and the vertical-dimension parameter of the antenna.

18. The communication method according to claim 11, wherein
the horizontal-dimension parameter of the antenna comprises a quantity of horizontal-dimension antenna ports; and
the vertical-dimension parameter of the antenna comprises a quantity of vertical-dimension antenna ports.

19. The communication method according to claim 11, wherein the first information indicates an index value of the first matrix and an index value of the second matrix; or the first information indicates an index value of the precoding matrix.

20. A chip, comprising a processor, wherein the processor is coupled to a memory, and is configured to execute a computer program or instructions stored in the memory; and when the processor executes the computer program or the instructions, the method according to claim 10 is performed.

* * * * *